United States Patent
Horton

(10) Patent No.: US 6,421,696 B1
(45) Date of Patent: Jul. 16, 2002

(54) SYSTEM AND METHOD FOR HIGH SPEED EXECUTION OF FAST FOURIER TRANSFORMS UTILIZING SIMD INSTRUCTIONS ON A GENERAL PURPOSE PROCESSOR

(75) Inventor: David C. Horton, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/375,458

(22) Filed: Aug. 17, 1999

(51) Int. Cl.$^7$ .............................................. G06F 15/00
(52) U.S. Cl. ...................................... 708/404; 708/409
(58) Field of Search ................................ 708/400, 402, 708/403, 404, 405, 406, 408, 409; 712/20, 21, 22

(56) References Cited

U.S. PATENT DOCUMENTS

| | | | |
|---|---|---|---|
| 4,829,465 A | | 5/1989 | Knauer et al. |
| 5,117,381 A | | 5/1992 | Juri et al. |
| 5,483,475 A | | 1/1996 | Kao |
| 5,590,066 A | | 12/1996 | Ohki |
| 5,596,517 A | | 1/1997 | Jones et al. |
| 5,610,849 A | | 3/1997 | Huang |
| 5,754,456 A | | 5/1998 | Eitan et al. |
| 5,835,392 A | * | 11/1998 | Dulong et al. ............... 708/404 |
| 5,991,787 A | * | 11/1999 | Abel et al. .................. 708/400 |

FOREIGN PATENT DOCUMENTS

| | | |
|---|---|---|
| EP | 0 366 435 | 5/1990 |
| EP | 0 416 311 | 3/1991 |
| EP | 0 468 165 | 1/1992 |
| GB | 2 304 946 | 3/1997 |

OTHER PUBLICATIONS

*Intel Architecture Software Developer's Manual*, vol. 2: Instruction Set Reference, 1999.
"Enhanced 3D Now!™ Technology for the AMD Athlon™ Processor," Aug. 2000, pp. 1–11.
"Inside 3DNow!™ Technology," ©2001 Advanced Micro Devices, Inc., pp. 1–4.
"3DNow!™ Technology in Microsoft DirectX 6.x," ©2001 Advanced Micro Devices, Inc. pp. 1–6.
"3DNow!™ Fact Sheet," ©2001 Advanced Micro Devices, Inc., p. 1.

(List continued on next page.)

*Primary Examiner*—Chuong Dinh Ngo
(74) *Attorney, Agent, or Firm*—Conley, Rose & Tayon, PC; B. NoëKivlin

(57) ABSTRACT

A method for performing Fast (forward or inverse) Fourier Transform in a micro-processor-based computer system. The microprocessor includes parallel execution resources for executing parallel floating-point addition, subtractions and multiplication operations on the contents of a specialized set of internal registers. The method comprises performing computations associated with two adjacent butterflies simultaneously and in parallel. Thus, data operands are accessed, and computational results are stored, from/to memory in pairs. Furthermore, the ordering and arrangement of program instructions is optimized with respect to the execution resources available in the microprocessor. Care is taken to avoid potential stalling conditions. A processor simulator is used to anticipate and avoid potential resource conflicts. For example, instructions which require a common execution resource may be separated with one or more intervening instructions which utilize different execution resources. In addition, alignment instructions are inserted in strategic position within code sequences to guarantee proper alignment of subsequent instructions with cache lines. The first two passes and the last pass of the FFT algorithm are computed separately.

12 Claims, 13 Drawing Sheets

OTHER PUBLICATIONS

"ADM 3DNow!™ Frequently Asked Questions," ©2001 Advanced Micro Devices, p. 1.

*3DNow!™ Technology Manual*, © 2000 Advanced Micro Devices, Inc., pp. 1–62.

*AMD Extesions to the 3DNow!™ and MMX™ Instructions Sets Manual*, © 2000 Advanced Micro Devices, pp. 1–36.

Arai et al., "A Fast DCT–SQ Scheme for Images," Transactions fo the IEICE, vol. E71, No. 11, Nov. 1988, pp. 1095–1097.

Hung, "Statistical Inverse Discrete Cosine Transforms for Image Compression," SPIE vol. 2187, 1994, pp. 196–205.

Oppenheim et al., Discrete–Time Signal Processing, Prentice–Hall, Inc. 1989, pp. 587–609.

"AMD–K6® Processor, Code Optimization, Application Note," Publication No. 21924, Advanced Micro Deviced, Aug. 1999, pp. iii–x and 57–84.

* cited by examiner

SYSTEM AND METHOD FOR HIGH SPEED EXECUTION OF FAST FOURIER TRANSFORMS UTILIZING SIMD INSTRUCTIONS ON A GENERAL PURPOSE PROCESSOR

FIELD OF THE INVENTION

The present invention relates to the field of digital signal processing, and more specifically, to a system and method for performing forward and inverse discrete Fourier transforms in a microprocessor-based processing environment.

DESCRIPTION OF THE RELATED ART

Digital signal processing (DSP) is fundamental to a variety of modern technologies. Improvements in DSP algorithms are rapidly incorporated into new products and devices, and serve as a motive force behind the modem telecommunications industry. This is especially true for improvements in transformation algorithms such as the Fast Fourier Transform.

As with other types of processing, digital signal processing may be accomplished in a batch mode or a real-time mode. Batch-mode processing involves (a) reading input data from memory, (b) performing a number DSP operations, and (c) storing the resultant output data to memory. One disadvantage of batch-mode processing is that the storage-capacity requirement for the memory may be prohibitively high. For example, if the input data represents frames of a video signal, a large amount of memory may be consumed to store a few minutes worth of video frames.

On the other hand, real-time processing involves receiving an input data stream from a data source, operating on the input data stream (i.e. applying a DSP algorithm) to generate an output data stream, and providing the output data stream to a data sink, where the data rate of the input data stream and/or the output data stream are specified. For example, the data source may be a video camera which generates video frames at a fixed rate, and the data sink may be a video monitor. Real-time processing requires that the average rate of throughput of the DSP algorithm must be greater than or equal to the specified data rate. The input and output data streams are generally buffered. The size of the input buffer and the specified data rate determine a maximum time for the DSP algorithm to process the input buffer contents.

Real-time processing generally implies less of a necessity for data storage since the output data stream is consumed (i.e. used) by the data sink shortly after it is generated by the DSP algorithm. However, the computational throughput requirement of real-time processing typically places a severe demand on the efficiency of the DSP algorithm and the speed of the processor used to implement it.

DSP theory provides a host of tools for the analysis and representation of signal data. Among these tools, the Fourier Transform is one of the most important. The Fourier Transform operates on an input function in order to generate a resultant function. FFTs operate upon a block of data extracted from this input function, either sequential blocks or overlapping blocks. There are real and complex-valued input and output versions of the FFT, in-place and not-in-place computational forms. The complex value of the resultant function at a given frequency represents the amplitude and phase of a sinusoidal component of the input function. Thus, the Fourier Transform is said to perform a conversion between the time domain and the frequency domain. The Fourier Transform just described is generally referred to as the forward Fourier transform to distinguish it from the inverse Fourier transform. The inverse Fourier Transform inverts (i.e. reverses) the forward Fourier transform. Thus, the inverse Fourier Transform operates on functions of frequency and generates corresponding functions of time.

By use of the forward and inverse Fourier Transforms, a signal may be converted between a time-domain representation and a frequency-domain representation. The forward Fourier transform is said to perform a spectral analysis of a time-domain signal because it computes the amplitude and phase of all the sinusoidal components of the time-domain signal. The inverse Fourier transform is said to perform a spectral synthesis of a time-domain signal because the formula for the inverse transform describes the time-domain signal as a linear combination (albeit infinite combination) of the spectral components.

Fourier transforms are inherently continuous mathematical transformations. Since computers are constrained to operate on discrete data, a special discretized form of the Fourier transform is used for computer implementations, i.e. the so called Discrete Fourier Transform (DFT). The Discrete Fourier Transform may be used in a wide variety of applications and allows an arbitrary input array size. However, the straightforward DFT algorithm is often prohibitively time-consuming.

In 1965, Cooley and Tukey disclosed an efficient algorithm for performing the Discrete Fourier Transform. This algorithm, known as the Fast Fourier Transform, exploits symmetries inherent in DFTs of order $2^K$ for any integer K. The order of a DFT may be defined as the size of its input array. The structure of the FFT algorithm allows one complex multiplication factor $e^{jw}$ to be used for all the butterflies in a group rather than having to recalculate complex-valued multiplication factors for each butterfly.

In addition, the FFT algorithm uses either (a) a natural ordering to access input operands and a special interleaved order to write output operands, or (b) the special interleaved order to access input operands and natural ordering to write output operands. The special interleaved ordering is then used either at the input or the output but not both. For clarity of discussion, suppose the input operands are accessed in the interleaved order. Furthermore, suppose that the input array comprises eight samples of a signal X. Thus, the eight samples may be represented as X(000), X(001), X(010), X(011), X(100), X(101), X(110) and X(111) in the order they appear in the input array. The FFT algorithm accesses these input values in the order X(000), X(100), X(010), X(110), X(001), X(101), X(011) and X(111). Coley and Tukey realized that the addresses of samples in the access order and the memory order were effectively bit reversed. Another way to interpret the special access order is in terms of a reverse carry bit from an address calculation adder. Carries are propagated from left to right rather than the more typical right-to-left direction.

In many processor architectures used for Digital Signal Processing, such as the popular Harvard architecture, the throughput of a processing algorithm is determined primarily by the total number of data multiplies and additions. Data moves and branching operations (such as, e.g., those which implement a loop construct) may require significantly lower overhead than multiplies and additions in many architectures. Consequently, a reasonable estimate of the computational complexity of a processing algorithm may be obtained by counting the number of data multiplies as a function of the number of data points in the input buffer. An N-point DFT requires $N^2$ multiplies. For large array sizes (which correspond to fine frequency resolution), the number of arithmetic operations then becomes extremely large. In contrast, the number of multiplies for an N-point FFT is $N \cdot \log_2(N)$. Thus, the FFT exhibits a greatly reduced complexity relative to the DFT especially for larger array sizes.

The Fast Fourier Transform algorithm, because of its greatly reduced computational complexity, allowed more sophisticated signal processing algorithms to be implemented in real-time applications than are possible with the DFT. For example, FFTs are one key component of interactive speech-recognition algorithms, so faster FFTs enable better and more complete analysis of speech.

Traditional x86 processors are not well adapted for the types of calculations used in signal processing. Thus, signal processing software applications on traditional x86 processors have lagged behind what was realizable on other processor architectures. There are been various attempts to improve the signal processing performance of x86-based systems. For example, microcontrollers optimized for signal processing computations (DSPs) have been provided on plug-in cards or the motherboard. These microcontrollers operated essentially as coprocessors enabling the system to perform signal processing functions.

Advanced Micro Devices, Inc. (hereinafter referred to as AMD) has proposed and implemented a set of SIMD (single-instruction multiple-data) instructions on an x86 processor known as the AMD-K6®-2 and subsequent processors. The SIMD instructions are collectively referred to as 3DNow!™. The AMD-K6®-2 is highly optimized to execute the 3DNow!™ instructions with minimum latency. The 3DNow!™ instructions invoke parallel floating-point operations. Software applications written for execution on the AMD-K6®-2 may use the 3DNow!™ instructions to accomplish signal processing functions and traditional x86 instructions to accomplish other desired functions. Thus, the AMD-K6®-2 provides general purpose and signal processing capacity on a single chip, and therefore, at a cost which is significantly less than x86-based systems with DSP coprocessors.

Furthermore, since x86 processors tend to be on a very steep revision curve, the total DSP processing power available through the 3DNow!™ instructions should continue to increase very rapidly with attendant revolutions in the types of applications that are possible on personal computers. Several semiconductor vendors have licensed and intend to implement 3DNow!™ as an industry standard. Thus, it is especially desirable to achieve implementations of the FFT algorithm which optimize the use of the 3DNow!™ instruction set on x86 processors.

A number of fast algorithms for performing the DFT are described by Alan V. Oppenheim et al. in "Discrete-Time Signal Processing" [published by Prentice Hall, ISBN 0-13-216292-X, pages 587–609] which is hereby incorporated by reference. FIG. 1 is a signal flow graph which corresponds to a prior art FFT algorithm (see Oppenheim, "Discrete-Time Signal Processing", page 587). The flow of signal information is from left to right in the diagram. FIG. 1 illustrates an eight point inverse FFT. The complex input values are denoted $x(0)$ through $x(7)$. The complex output values are denoted $y(0)$ through $y(7)$, and represent the inverse FFT values in bit-reversed order. The flow graph includes three passes labeled with index m running from one to three. In general, the number of points N to be transformed and the number of passes v are related by the equation $v=\log_2(N)$. The coefficients $W_N^{-k}$ are defined by the relation $$W_N^{-k} = \exp\left(\frac{2\pi k \cdot j}{N}\right),$$

where j is the complex square-root of −1. The coefficients $W_N^{-k}$ are often referred to as "twiddle factors". In Cartesian form, the twiddle factor expression takes the form $$W_N^{-k} = \cos\left(\frac{2\pi k}{N}\right) + j \cdot \sin\left(\frac{2\pi k}{N}\right).$$

It is noted that the computations in the flow graph of FIG. 1 naturally occur in symmetric pairs called butterflies. FIG. 2 illustrates a butterfly from the generic pass m. The butterfly receives two complex-valued inputs $u_r^m$ and $u_s^m$ from the previous pass (m−1), and generates two complex-valued outputs $u_r^{m+1}$ and $u_s^{m+1}$ which are supplied to the next pass (m+1). The indices r and s define the vertical position of operands in the flow graph, e.g. the value $u_r^m$ occurs on the $r^{th}$ horizontal line (at the input to the $m^{th}$ pass). The structure of the butterfly coincides with the following equations defining $u_r^{m+1}$ and $u_s^{m+1}$ in terms of $u_r^m$ and $u_s^m$:

$$u_r^{m+1} = u_r^m + W_N^{-k} \cdot u_s^m,$$

$$u_s^{m+1} = u_r^m - W_N^{-k} \cdot u_s^m.$$

Each pass of the flow graph of FIG. 1 is organized into one or more groups of similar butterflies. For example, the first pass (m=1) comprises a collection of (N/2) successive butterflies which use the same coefficient $W_N^0$, where N is the number of points to be transformed. The second pass (m=2) comprises two distinct groups of butterflies, where each group includes (N/4) successive butterflies involving the same coefficient $W_N^{-k}$: the first group uses coefficient $W_N^0$, and the second group uses coefficient $W_N^{-2}$. In the generic pass m, there are $2^{m-1}$ groups of butterflies. Each of these groups has $2^{v-m}$ butterflies which use the same coefficient $W_N^{-k}$.

Furthermore, the distance between butterfly operands given by difference (s−r) depends on the pass m. In the first pass (m=1), the butterfly operands are separated by a distance of (N/2) points. In the second pass (m=2), the butterfly operands are separated by a distance of (N/4) points. In general, the butterfly operands are separated by distance $s-r=2^{v-m}$.

SUMMARY OF THE INVENTION

The problems outlined above of implementing a rapid (forward or inverse) Fast Fourier Transform on an x86-based microprocessor are in large part solved by the software-based method of present invention. Processors such as the AMD-K6®-2 which support 3DNow!™ are configured to execute instructions (or parts of instructions) in parallel. According to the present invention, the execution efficiency of an FFT algorithm may be maximized by carefully composing code sequences of the FFT algorithm so that resource conflicts and the attendant processor stalls are avoided.

The present invention contemplates a system and method for performing a Fast (forward or inverse) Fourier transform in a computer system comprising an x86 processor which supports 3DNow!™ instructions, and a memory. The 3DNow!™ instructions are explicitly parallel and operate on two sets of 32-bit floating-point data simultaneously. A special set of internal registers may serve as the source and/or destination registers for the 3DNow!™ instructions.

Each of the internal registers includes a lower 32-bit component and an upper 32-bit component. In many implementations, the existing 64-bit floating-point/MMX® registers may also be utilized as the 3DNow!™ source and/or destination registers with attendant additional logic to implement the 3DNow!™ SIMD usage of these registers.

The method of the present invention preferably comprises: (a) executing an initial processing loop which accesses an input array contained within the memory (or cache) and generates a second-pass output array, wherein the input array stores N complex input values; (b) executing $\log_2(N)-3$ intermediate-pass processing iterations, where a first one of the intermediate-pass processing iterations operates on the second-pass output array, and a last one of the intermediate-pass processing iterations generates a penultimate-pass output array; and (c) executing a final-pass processing loop which operates on the penultimate-pass output array and generates a final output array, wherein the final output array represents the Discrete Fourier Transform (DFT) or Inverse Discrete Fourier Transform (DFT) of the input array values. (In an in-place computation, the input array, the second-pass output array, the penultimate-pass output array, and the final output array are separate names for a common block of memory which is overwritten repeatedly).

In the preferred embodiment, each of the intermediate-pass processing iterations comprises a series of group iterations, and furthermore, each group iteration includes a series of butterfly-pair iterations. The generic butterfly-pair iteration comprises executing a code sequence which includes a plurality of the parallel floating-point instructions. In addition to the plurality of parallel floating-point instructions, other instructions are necessary in the code sequence. These "other instructions" may be inserted between two of the parallel floating-point instructions which use a common execution resource in the x86 processor such as the 3DNow!™ adder or multiplier. Thus, resource conflicts are advantageously avoided at execution time.

The non-SIMD instructions of the code sequence also include a plurality of load instructions. The load instructions are also separated from each other in the code sequence by non-load instructions. This separation allows each load instruction sufficient time to complete before the next load instruction is issued, and thereby avoids stalls in the load pipeline. The non-load instructions may include some of the plurality of parallel floating-point instructions.

In the evolution of modem x86-architecture microprocessors clock-cycle times have continuously decreased. Accordingly, the time required to access system memory has become an increasingly significant constraint to the processing capacity of x86 microprocessors. Thus, tremendous effort has been targeted toward the development of technologies for decreasing memory access time and increasing memory access band-width. As a result of these technologies, in the AMD-K6®, AMD-K6®-2, AMD-K6®-III, and subsequent members of the family, accessing a full width operand from memory is generally as fast as accessing a narrower operand. In addition, the time required to access a 64-bit operand with a single SIMD instruction such as movq or punpckldq is much smaller than the time required to access the same data in two 32-bit slices with two non-SIMD instructions. Thus, by accessing 64-bit operands with SIMD instructions, the FFT algorithm of the present invention may advantageously access pairs of 32-bit data more efficiently than prior art algorithms.

The initial-pass processing loop performs butterfly computations associated with the first two passes of the FFT in an integrated (i.e. unified) fashion. Since the complex coefficients W(-t,N) for the first two passes reduce to either 1 or j (i.e. square-root of -1), the equations for the first two passes easily simplify and admit combination. The initial-pass processing loop executes N/2 butterfly-pair iterations. Each of the butterfly-pair iterations generates four complex output values which are written to the second-pass output array. The real and imaginary parts of each of these complex output values are computed by executing a set of parallel operations on the data pairs stored in the internal registers.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

Figure 1:
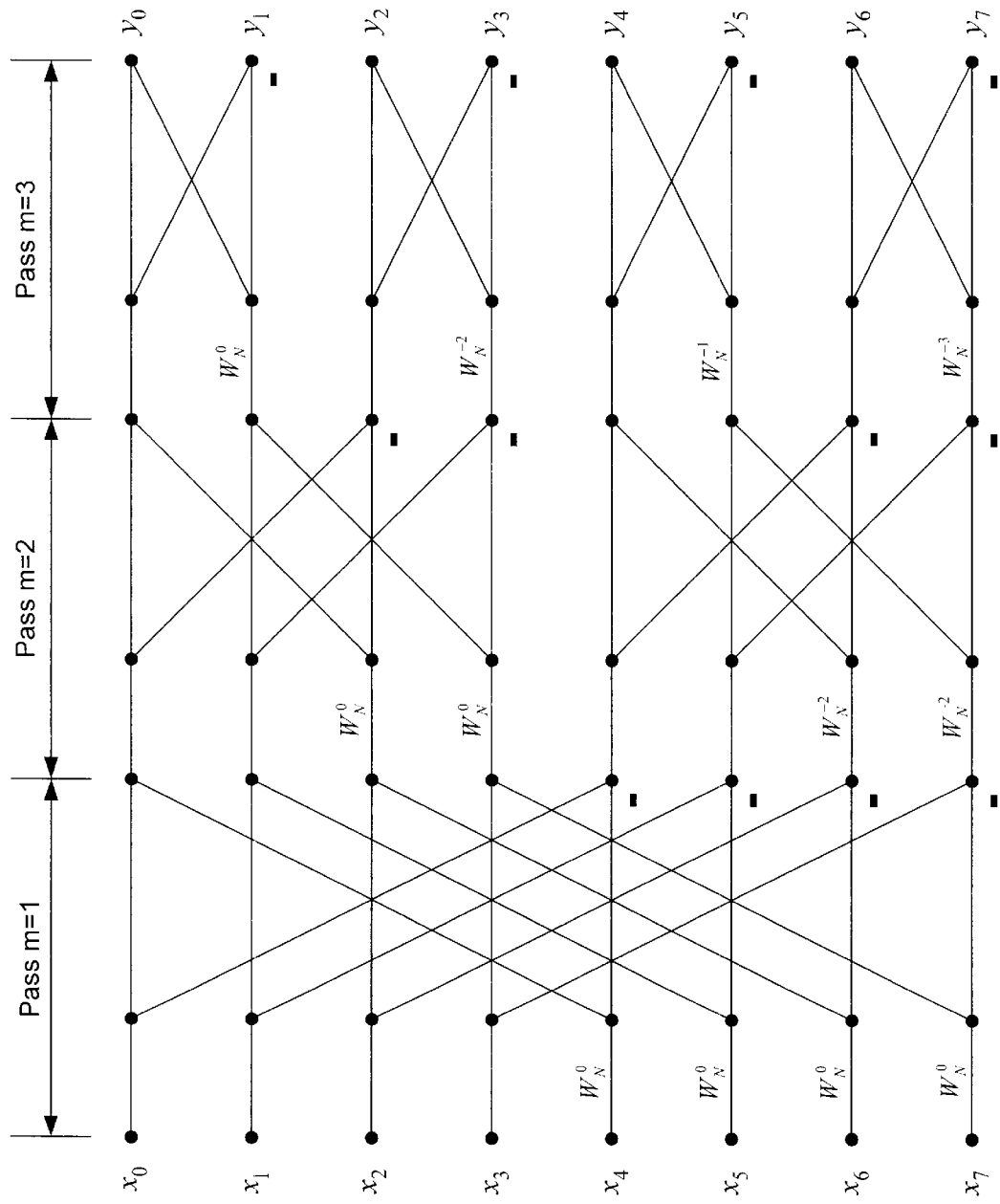
FIG. 1 is a signal flow graph of an inverse FFT algorithm according to the prior art.
Figure 2:
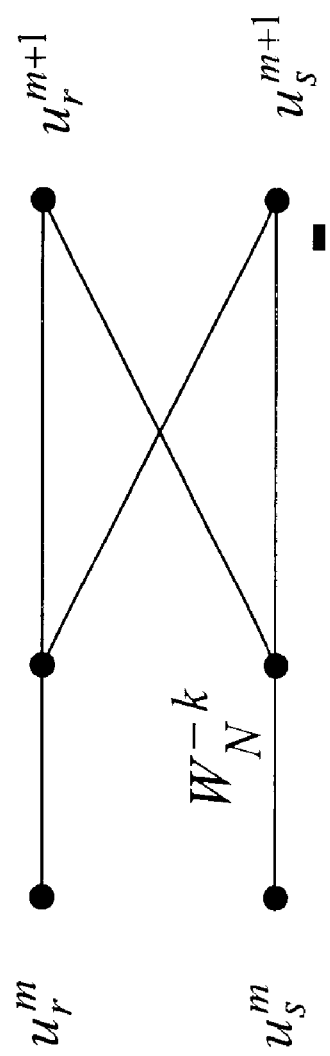
FIG. 2 illustrates the structure of a butterfly abstracted from the signal flow graph of FIG. 1 according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The forward and inverse Fast Fourier Transform (FFT) implementations of the present invention require a processor configured with AMD's 3DNow!™ technology as well as MMX® technology. The AMD-K6®-2 is one such processor.

Figure 3:
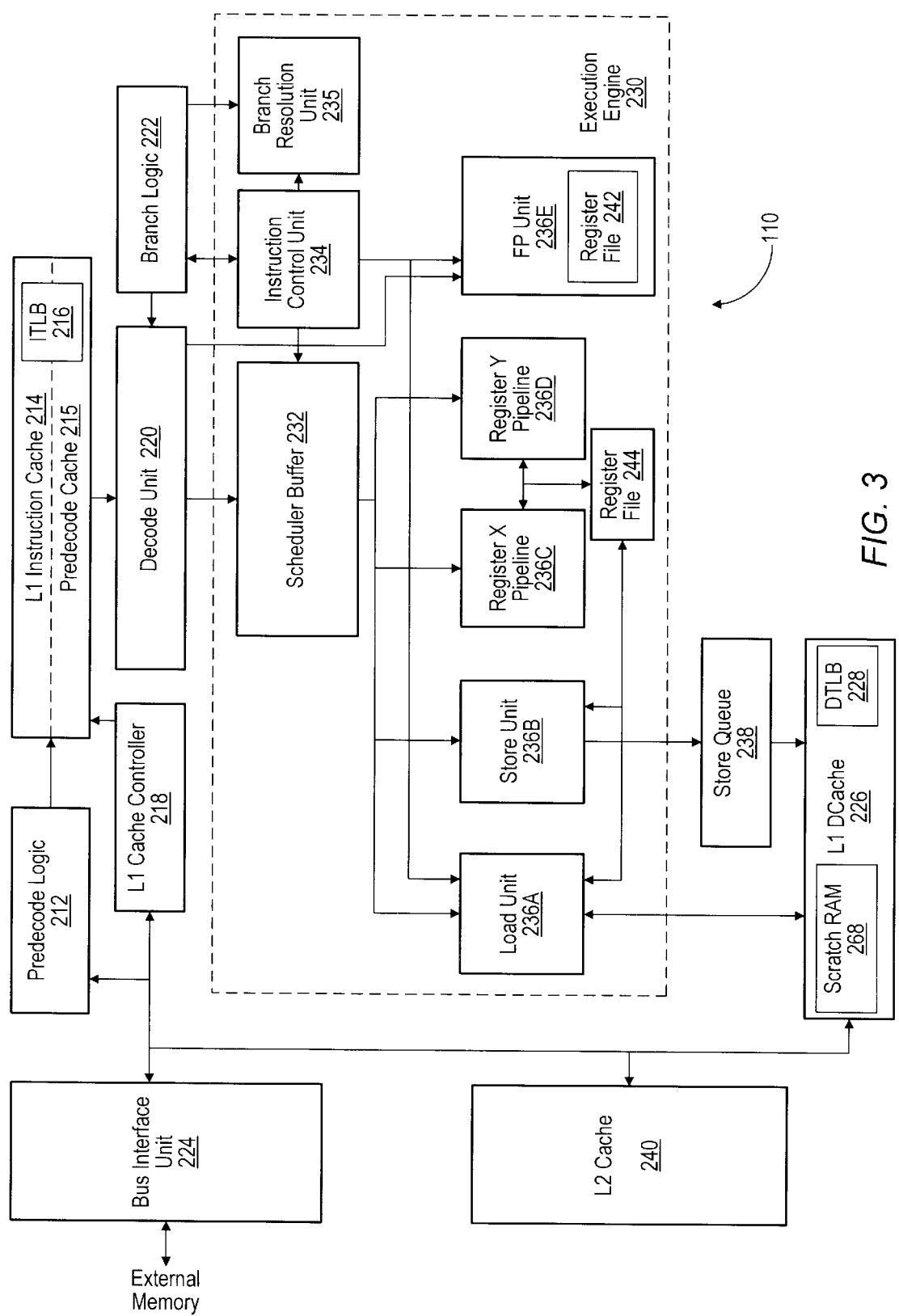
FIG. 3 is a block diagram of a microprocessor configured with 3DNow!™ technology.

FIG. 3: A Microprocessor Configured with 3DNow!™ and MMX® Technologies

FIG. 3 is a block diagram for a microprocessor 110 configured with 3DNow!™ and MMX® technologies which may host the software FFT algorithms of the present invention. Microprocessor 110 includes a predecode logic block 212 which is coupled to an instruction cache 214 and a predecode cache 215. Caches 214 and 215 also include an instruction translation lookaside buffer (TLB) 216. A cache controller 218 is coupled to predecode logic block 212, instruction cache 214, and predecode cache 215. Controller 218 is additionally coupled to a bus interface unit 224, a level-one data cache 226 (which includes a data TLB 228 and a scratch RAM 268), and an L2 cache 240. Microprocessor 110 further includes a decode unit 220, which receives instructions from instruction cache 214 and predecode data from predecode cache 215. This information is forwarded to execution engine 230 in accordance with input received from a branch logic unit 222.

Execution engine 230 includes a scheduler buffer 232 coupled to receive input from decode unit 220. Scheduler buffer 232 is coupled to convey decoded instructions to a plurality of execution pipelines 236A–236E in accordance with input received from instruction control unit 234. Execution pipelines 236A–236E include load unit 236A, store unit 236B, register X pipeline 236C, register Y pipeline 236D, and floating point unit 236E. Load unit 236A receives input from data cache 226, while store unit 236B interfaces to data cache 226 via a store queue 238. Elements referred to herein with a reference number followed by a letter will be collectively referred to by the reference number alone. For example, execution pipelines 236A–236E will be collectively referred to as execution pipelines 236.

Register X pipeline 236C and register Y pipeline 236D each include a combination of integer, multimedia, and 3DNow!™ execution resources. Some of these resources are shared between the two register pipelines. Each register pipeline supports the execution of integer, multimedia, and 3DNow!™ instructions depending on the execution resources available to the pipeline. The execution resources available in each register pipeline will be explained in greater detail below in connection with FIG. 4B.

As shown in FIG. 3, load unit 236A, store unit 236B, and register pipelines 236C–236D are coupled to a register file 244, from which these units are configured to read source operands, and to which load unit 236A and register pipelines 236C–236D are configured to store destination result values. Register file 244 includes physical storage for a set of architected 3DNow!™/multimedia registers as well as for a set of architected integer registers.

Integer instructions executed in the register pipelines 236C and 236D utilize the integer registers of register file 244 for source and/or destination operands. Additionally, MMX® and 3DNow!™ instructions executed in the register pipelines 236C and 236D employ the 3DNow!™/MMX® registers of register file 244 for source and/or destination operands. As used herein, the term MMX® instructions refers to packed integer operations (e.g. operations such as those defined by the MMXI instructions within the x86 instruction set). Furthermore, the term 3DNow!™ instructions as used herein includes packed floating point operations optimized for three-dimensional graphics and/or signal processing. Both MMX® and 3DNow!™ instructions are designed to be applicable to a variety of multimedia application usages.

Floating point unit 236E is also shown as including a register file 242. Register file 242 includes physical storage locations assigned to a set of architected floating point registers. Floating point instructions (e.g. x87 floating point instructions, or IEEE 754/854 compliant floating point instructions) are executed by floating point unit 236E, which reads source operands from register file 242 and updates destinations within register file 242 as well. The 3DNow!™/MMX® registers of register file 244 are logically mapped (i.e. aliased) onto the floating point registers of register file 242. This is done to both reduce silicon area and costs and to implement effective task-switching without necessitating major changes to the operating system, for example Microsoft Windows®.

As used herein, the term "logical storage location" refers to a storage location (e.g. a register) which is architecturally defined to exist. In other words, the instruction set specification defines the storage location, and instructions can specify the storage location as an operand. On the other hand, a "physical storage location" refers to a storage location actually implemented in hardware on microprocessor 110. A logical storage location is said to be "mapped" to a particular physical storage location if an instruction coded to access the logical storage location results in an access to the particular physical storage location.

It is noted that microprocessor 110 may employ register renaming with respect to register files 242 and 244, such that a particular physical 3DNow!™/MMX® register within register file 244 is not permanently assigned to a given logical floating point register, and similarly a particular physical location within register file 244 is not permanently assigned to a given logical 3DNow!™/MMX® register.

As shown in FIG. 3, microprocessor 110 includes execution pipelines 236A–236E. Store unit 236B and load unit 236A are two-staged pipeline designs. Store unit 236B performs memory writes. For a memory write operation, the store unit 236B generates a physical address and the associated data bytes which are to be written to memory. These results (i.e. physical address and data bytes) are entered into the store queue 238. In one embodiment, the store queue holds up to seven data results. Each of the data results may be 8-, 16-, 32-, or 64-bit quantities.

Memory read data may be supplied by data cache 226 or by an entry in store queue 238 (in the case of a recent store). If the data is supplied by store queue 238, there is no additional execution latency. This implies that a dependent load operation may complete execution one clock-cycle after a store operation completes execution. Load and store units are possible in other embodiments with varying latencies.

Execution pipeline 236E contains an IEEE 754/854 compliant floating point unit designed to accelerate the performance of software which utilizes the x86 (or x87) floating point instructions. Execution pipeline 236E may include an adder unit, a multiplier unit, and a divide/square root unit. Execution pipeline 236E may operate in a coprocessor-like fashion, in which decode unit 220 directly dispatches the floating point instructions to execute pipeline 236E. The floating point instructions are still allocated in scheduler buffer 232 to allow for in order retirement of instructions. Execution pipeline 236E and scheduler buffer 232 communicate to determine when a floating point instruction is ready for retirement.

Branch resolution unit 235 is separate from the branch prediction logic 222 in that it resolves conditional branches after the branch conditions have been evaluated. Branch resolution unit 235 allows efficient speculative execution, enabling microprocessor 110 to execute instructions beyond conditional branches before knowing whether the branch prediction was correct. Microprocessor 110 is configured to handle up to seven outstanding branches in one embodiment.

Branch prediction logic 222, coupled to decode unit 220, is configured to increase the accuracy with which conditional branches are predicted in microprocessor 110. Branch prediction logic 222 is configured to handle branch behavior and its negative effects on instruction execution, such as stalls due to delayed instruction fetching.

Branch prediction logic 222 implements a two level adaptive history algorithm using a branch history table. This table stores executed branch information, predicts individual branches, and predicts behavior of groups of branches. To avoid a clock cycle penalty for a cache fetch when a branch is predicted as taken, a branch target cache within branch logic 222 supplies the first 16 bytes at the target address directly to the instruction buffer (if a hit occurs in the branch target cache).

Figure 4A:
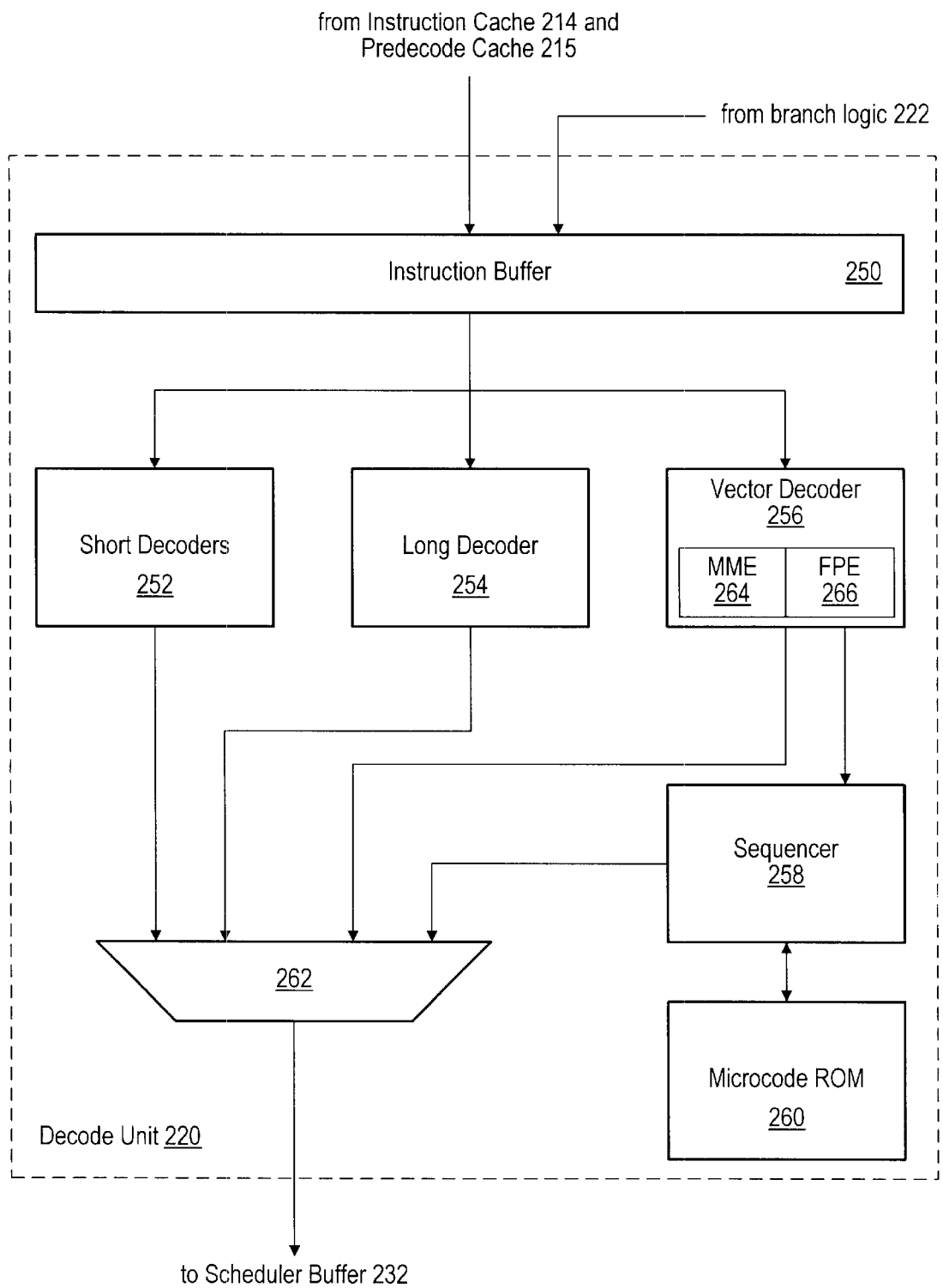
FIG. 4A is a block diagram of decode unit 220 of FIG. 3.

FIG. 4A: Decode Unit 220

Turning next to FIG. 4A, a block diagram of one embodiment of decode unit 220 is shown. Other embodiments are possible and contemplated. In the embodiment shown in FIG. 4A, decode unit 220 includes an instruction buffer 250, a set of short decoders 252, a long decoder 254, a vector decoder 256, a sequencer 258, a microcode ROM 260, and an output select multiplexor (mux) 262. Instruction buffer 250 is coupled to receive instruction bytes and corresponding predecode data from instruction cache 214 and predecode cache 215 or from branch logic unit 222 in the event that a branch is predicted as taken. Instruction buffer 250 is also coupled to short decoders 252, long decoder 254, and vector decoder 256. Each of short decoders 252, long decoder 254, vector decoder 256, and sequencer 258 are coupled to provide inputs to output select mux 262. Vector decoder 256 is also coupled to sequencer 258 which is further coupled to microcode ROM 260. Output select mux 262 is coupled to scheduler buffer 232. Vector decoder 256 includes a pair of storage locations 264 and 266. Storage location 264 stores a multimedia enable indication, while storage location 266 stores a floating point enable indication.

Instruction buffer 250 is configured to store instruction bytes and corresponding predecode data until the bytes are decoded and dispatched by one of decoders 252, 254 or 256. In each clock cycle, instruction buffer 250 discards the instruction bytes which have been decoded and merges the remaining instruction bytes with instruction bytes received from instruction cache 214 (and predecode cache 215) or branch logic unit 222. In one embodiment, instruction buffer 250 stores up to 16 instruction bytes and corresponding predecode data.

Short decoders 252 translate the most commonly used x86 instructions (e.g. moves, shifts, branches, etc.) into zero, one or two RISC ops each. Short decoders 252 are configured to operate upon "short" x86 instructions. In other words, short decoders 252 are configured to decode instructions having a number of bytes up to a predefined maximum length. In one embodiment, the predefined maximum length is seven bytes. In one embodiment, short decoders 252 comprise two parallel decoders.

Long decoder 254 decodes one instruction per clock cycle and generates up to four RISC ops in response to the instruction. Long decoder 254 is configured to decode instructions which are longer than the predefined maximum length supported by short decoders 252 and are decomposable into four or fewer RISC ops. In one embodiment, long decoder 254 is configured to decode instructions up to 11 bytes in length.

Vector decoder 256 decodes the remaining instructions not handled by short decoders 252 or long decoder 254. Vector decoder 256 is configured to generate the first four RISC ops of a microcode routine corresponding to the instruction being decoded. In parallel, vector decoder 256 is configured to generate an entry point (i.e. an address within microcode ROM 260) at which the remainder of the routine is stored. Sequencer 258 fetches the remainder of the routine from microcode ROM 260 during subsequent clock cycles, and transmits the routine, up to four RISC ops at a time, to output select mux 262. A microcode routine comprises a sequence of instructions (e.g. RISC ops) which are arranged to accomplish a particular objective.

Output select mux 262 is configured to select instructions from one of its input sources (i.e. short decoders 252, long decoder 254, vector decoder 256, or sequencer 258) and to transmit those instructions to scheduler buffer 232. Each of the sources of instructions provides RISC ops to output select mux 262, and hence scheduler buffer 232 only receives RISC ops. Output select mux 262 is controlled by control signals (not shown in the drawing for clarity) from each of the decoders and sequencer 258.

It is noted that the instructions from instruction buffer 250 are provided to each of decoders 252, 254, and 256 in parallel. Each of the decoders attempts to decode each of the received instructions. Output select mux 262 selects the decoder which is able to most quickly decode a received instruction.

Figure 4B:
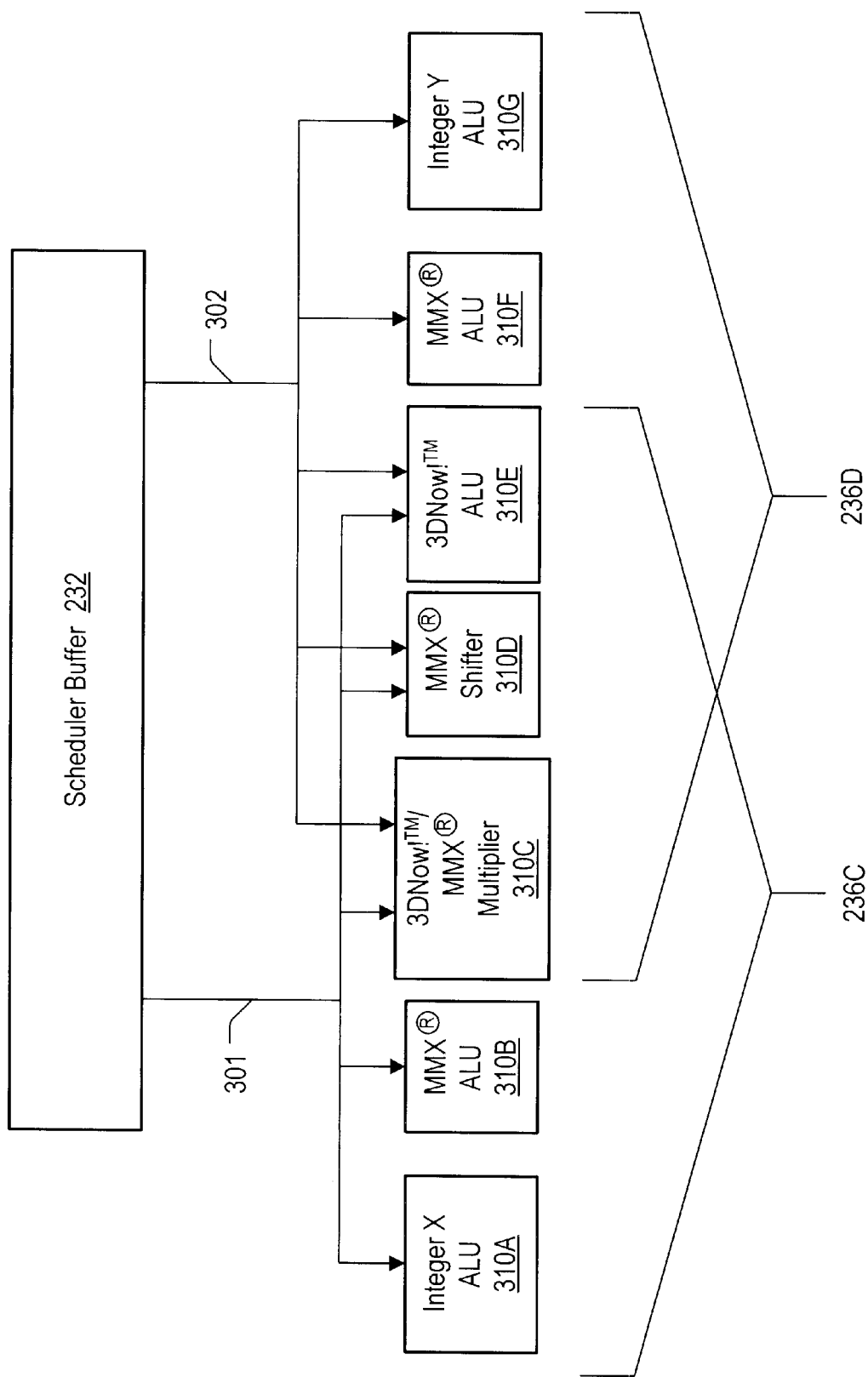
FIG. 4B is a block diagram of register pipelines 236 of FIG. 3 in connection with scheduler buffer 232.

FIG. 4B: Register Pipeline Resources

FIG. 4B illustrates the resources connected with register X pipeline 236C and the register Y pipeline 236D according to one embodiment of microprocessor 110. As shown in FIG. 4B, scheduler buffer 232 is coupled to integer X ALU 310A, MMX® ALU 310B, 3DNow!™/MMX® Multiplier 310C, MMX® Shifter 310D, and 3DNow!™ ALU 310E through Register X issue bus 301. In addition, scheduler buffer 232 is coupled to 3DNow!™/MMX® Multiplier 310C, MMX® Shifter 310D, 3DNow!™ ALU 310E, MMX® ALU 310F, and Integer Y ALU 310G through Register Y issue bus 302.

Integer X ALU 310A and MMX® ALU 310G are dedicated to Register X pipeline 236C. Similarly, Integer Y ALU 310G and MMX® ALU 310F are dedicated to Register Y pipeline 236D. Therefore, both register pipelines allow superscalar execution of integer and MMX® instructions. 3DNow!™/MMX® Multiplier 310C, MMX® Shifter 310D, and 3DNow!™ ALU 310E are shared by Register X pipeline 236C and Register Y pipeline 236D.

Integer X ALU 310A is configured to perform integer ALU operations, integer multiplications, integer divisions (both signed and unsigned), shifts, and rotations. Integer Y ALU 310G is configured to perform basic word and double word ALU operations (e.g. add, or, and, cmp, etc.). MMX® ALU 310 B and MMX® ALU 310F are both configured to perform addition, subtraction, logical, pack, and unpack operations corresponding to MMX® instructions. 3DNow!™/MMX® Multiplier 310C is configured to perform multiply operations corresponding to MMX® or 3DNow!™ instructions. 3DNow!™ ALU 310E is configured to perform packed floating point addition, subtraction, comparison, and integer conversion operations corresponding to 3DNow!™ instructions.

Any pair of operations which do not require a common resource (execution unit) may be simultaneously executed in the two register pipelines (i.e. one operation per pipeline).

For example, a 3DNow!™ multiply and a 3DNow!™ addition may be issued and executed simultaneously. However, an MMX® multiply and a 3DNow!™ multiply could not be issued simultaneously without inducing a resource contention (in the 3DNow!™/MMX® Multipler 310C) and a stall condition. Thus, the maximum rate of execution for the two pipelines taken together is equal to two operations per cycle.

Avoiding Resource Conflicts and Stall Conditions

The code sequences which comprise the FFT algorithm of the present invention have been carefully constructed so as to minimize the occurrence of resource conflicts. A resource conflict is quite often the result of a pair of instructions $A_i$ and $B_i$ which are adjacently coded in a code sequence and which require the same execution resource. Such pairs may be anticipated and purposely separated by one or more instructions $X_i$ which utilize execution resources other than that invoked by instructions $A_i$ and $B_i$. By separating the instructions $A_i$ and $B_i$, it is possible to guarantee that the second instruction $B_i$ is not forced to wait on the first instruction $A_i$, since $A_i$ will have completed by the time $B_i$ is ready to be issued. In addition, the "separating instruction" $X_i$ may be executed in parallel (i.e. simultaneously) with one of the "separated instructions" $A_i$ or $B_i$ since they invoke distinct execution resources.

3DNow!™ Instruction Set Architecture

The 3DNow!™/MMX® registers of register file 244 are denoted MM0 through MMn. In one embodiment of microprocessor 110, there are eight MM registers, i.e. MM0 through MM7, each having a 64 bit storage capacity. Two 32-bit floating point operands may be loaded into each MM register in a packed format. For example, suppose register MM0 has been loaded with floating-point operands A and B, and register MM1 has been loaded with floating-point operands C and D. In shorthand notation, this situation may be represented by the expressions MM0=[A:B] and MM1=[C:D], where the first argument in a bracketed pair represents the high-order 32 bits of a quadword register, and the second argument represents the low-order 32 bits of the quadword register. The 3DNow!™instructions perform parallel floating-point operations on the MM registers. For example, the 3DNow!™ add instruction given by the assembly language construct "pfadd MM0,MM1"

invokes a parallel floating-point addition on corresponding components of MM0 and MM1. The two floating-point resultant values of the parallel addition are stored in register MM0. Thus, after the instruction has completed execution, register MM0 may be represented by the expression MM0=[A+C:B+D]. As used herein, the assembly language construct "pfxxx MMdest, MMsrc"

implies that a 3DNow!™ operation corresponding to the mnemonic pfxxx uses registers MMdest and MMsrc as source operands, and register MMdest as a destination operand. This is a common format for x86 instruction mnemonics and is accepted by Microsoft® MASM™ and most other major x86-family assemblers.

It is noted that alternate embodiments of microprocessor 110 are contemplated where the storage capacity of an MM register allows for more than two floating-point operands. For example, an embodiment of microprocessor 110 is contemplated where the MM registers are configured to store four 32-bit floating-point operands. In this case, the MM registers would have a size of 128-bits.

Figure 5:
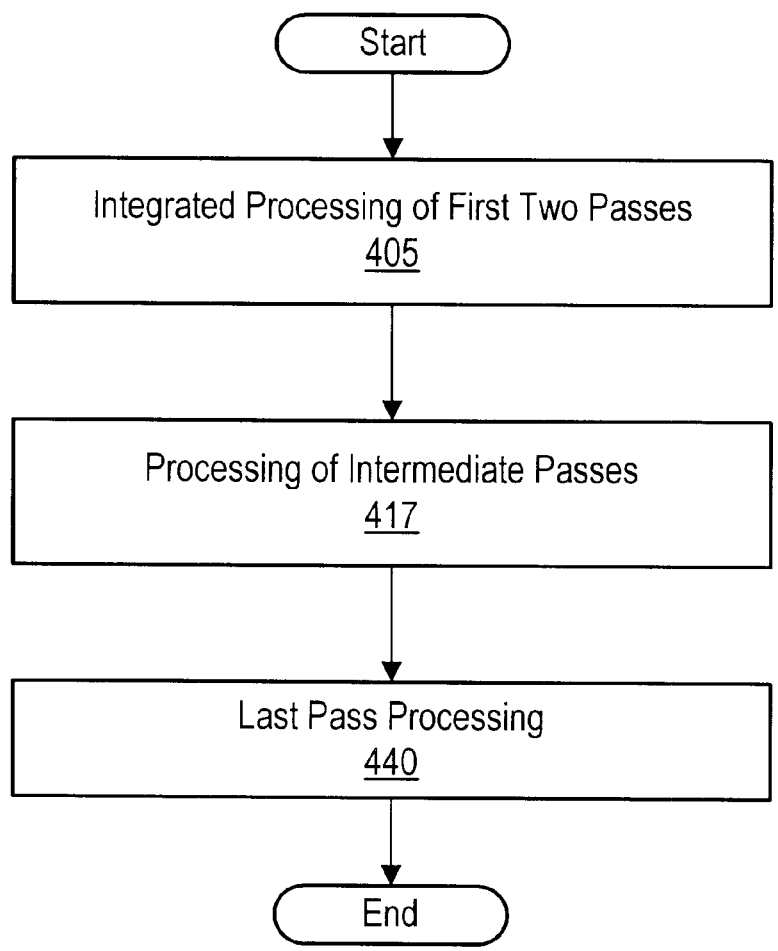
FIG. 5 is a flowchart of one embodiment of an FFT algorithm according to the present invention.

FIG. 5: FFT Algorithm Embodiment

FIG. 5 illustrates one embodiment of an FFT algorithm according to the present invention. In the preferred embodiment, the FFT algorithm is realized as a software subroutine coded in the instruction set of microprocessor 110. A calling routine, e.g. a signal processing application program, calls the forward or inverse Fast Fourier Transform (FFT) block. The FFT algorithm of FIG. 5 described below implements an inverse FFT. However, the FFT algorithm may just as easily implement a forward FFT by systematically replacing all complex coefficients W(−t,N) with their conjugates W(t,N), and multiplying the output values by an appropriate scalar constant. Note that the multiplication of the output values may be avoided by prescaling the complex coefficients W(t,N). Practitioners of the art of digital signal processing are aware of the symmetry of the forward and inverse Fast Fourier Transforms, and can easily convert between them, so for the sake of brevity, only the inverse FFT is illustrated here.

A number of calling parameters are passed to the FFT algorithm. The calling parameters include a pointer _fftbuf to a data buffer residing in system memory. Real and imaginary values may be interleaved or may be sequential. The example FFT shown uses sequentially-ordered data, but it is to be understood that Real/Imaginary data ordering is not important to the operation of the present invention, and different implementations may order these values differently.

Figure 6:
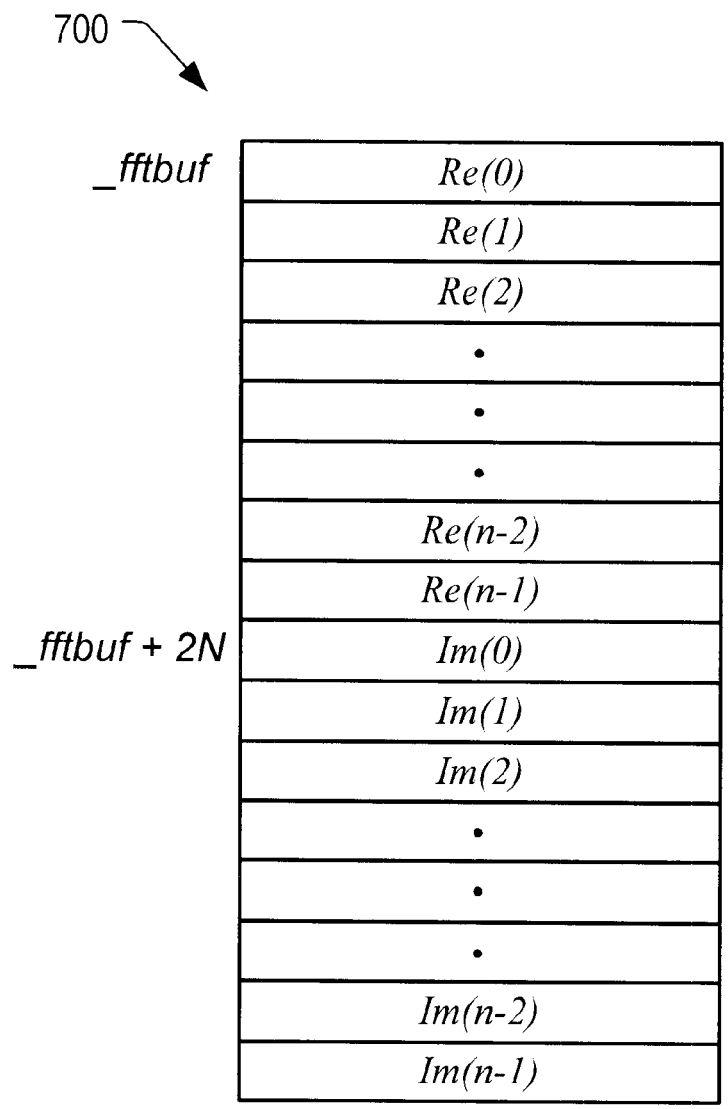
FIG. 6 illustrates a data array 700 which stores initial FFT operands and intermediate computational results as well as the final output of the FFT algorithm.

FIG. 6 illustrates a data buffer 700 which uses the Real/Imaginary data ordering. Data buffer 700 comprises an array of real values Re(k) followed by an array of imaginary values Im(k). Together the real array and imaginary array form an array of complex values Re(k)+j Im(k). The pointer _fftbuf points to the first real sample in the real array, denoted Re(0). A second parameter N supplied by the calling routine specifies the combined number of real values and imaginary values in data buffer 700, i.e. twice the number n of values in the real array.

In step 405, the first two passes (m=1,2) of the FFT algorithm are performed in an integrated (i.e. unified) fashion which takes advantage of the fact that the complex coefficients W(−k,N) in the first two passes take either the value W(0,N)=1, or W(−N/4,N)=j, where j denotes the square root of negative one. This integrated processing of the first two passes will be described in more detail below.

In step 417, the intermediate passes (m=3 to v−1) of the FFT algorithm are performed. Step 417 comprises three nested loops. The outer loop is the pass loop. The first inner loop processes groups within a pass. The innermost loop processes pairs of butterflies within a group. In step 440, the last pass (m=v) of the FFT algorithm is performed. The processing methodology of steps 417 and 440 will be described in more detail below.

The FFT algorithm uses several local variables. The variable gp represents the number of groups in each pass of the FFT algorithm. The variable fftn represents the number n of complex samples in the data buffer 700 which is equal to the number of real samples in the real array, or equivalently, the number of imaginary samples in the imaginary array. The variable fftnlg2m3 is initially loaded with a value equal to three less than the base two logarithm of the number n of complex samples in data array 700. Thus, the value fftnlg2m3 is three less than the number of passes in the FFT algorithm. Since, the first two passes and the last pass of the FFT algorithm are handled separately (in steps 405 and 440), there are exactly v-3 intermediate passes.

The variable fftrptr is a pointer to real values in the real array of data array 700, and is initialized to point to the first real value in the real array, i.e. the real value denoted Re(0) in FIG. 6. The variable fftiptr is a pointer to imaginary values in the imaginary array of data array 700, and is initialized to point to the first imaginary value in the imaginary array, i.e. the imaginary value denoted Im(0) in FIG. 6. The variable temp_k serves as a pass counter. The variable temp_j serves as a group counter.

Figure 7:
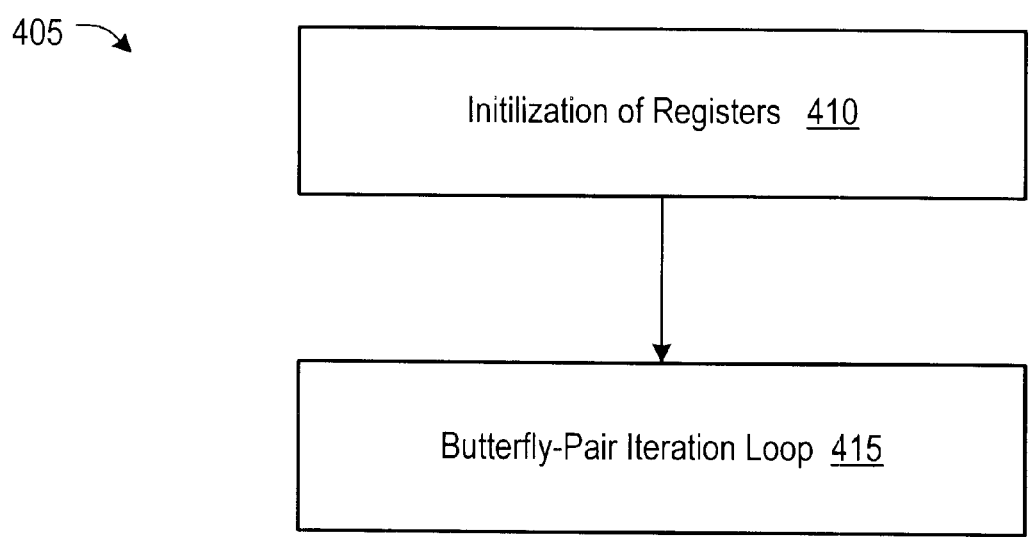
FIG. 7 illustrates the processing methodology for step 405, i.e. for the first two passes of the FFT algorithm according to the present invention.

FIG. 7: Integrated Processing of First Two Passes

FIG. 7 illustrates step 405, i.e. an integrated processing methodology for the first two passes of the FFT algorithm. Step 405 includes a series of register initializations represented by step 410, and a butterfly-pair iteration-loop 415.

In step 410, several registers are initialized as illustrated by the following code fragment.

```
movd    mm0,    DWORD PTR [edx]          (1)
mov     eax,    edi
movd    mm1,    DWORD PTR [edx + edi]    (2)
mov     eax,    eax   ; alignment
lea     ebx,    [edi*2 + edi]
movd    mm2,    DWORD PTR [edx + edi*2]  (3)
test    ax,     04h   ; alignment
```

Instruction (1) is a double-word move instruction, and thus, invokes a transfer of the imaginary sample currently addressed by the edx register to the lower doubleword of the 3DNow!™/multimedia register mm0. Thus, after the execution of instruction (1), the content of register mm0 may be represented by the expression mm0=[x:Im(0)], where the notation "x" indicates a "don't care" value. In instruction (2), the lower doubleword of register mm1 is loaded with the imaginary sample Im[n/4], wherein n is the number of complex input samples in data buffer 700. Thus, after the execution of instruction (2), register mm1 may be represented by the expression [x:Im(n/4)].

It is noted that an instruction with seemingly null effect, namely "mov eax, eax" is utilized in the above code sequence. This mov instruction serves to displace the starting byte of the subsequent instruction "lea ebx, [edi*2+edi]" from the end of one cache line to the beginning of the next cache line. Instructions such as the load effective address (lea) instruction normally invoke a short decode. However, when the starting byte of such an instruction occurs at the end of a cache line, i.e. in the last one, two, or, in some cases, three bytes of the cache line, predecode unit 212 is unable to determine the length of the instruction to be decoded. Thus, decode unit 220 cannot invoke a fast short decode and must dispatch the instruction to the much slower vector decode unit 256.

Since it may be especially disadvantageous for the staring byte of a short-decodable instruction to be located at the last one, two, or three bytes of a cache line, instructions may be inserted prior to the short-decodable instruction to displace the short-decodable instruction so as to start in the next succeeding cache line. Of course, it much preferred to use instructions which perform some meaningful computation (i.e. which assist the goal of the current executing algorithm) for insertion prior to the short-decodable instruction. However, if this is not feasible, an instruction with null effect, or an unnecessary instruction, such as the "mov eax,eax" instruction may be used. Although it may seem counter-intuitive, by strategically adding a few such instructions in a program in appropriate locations, the speed of execution and throughput of the program as a whole may be significantly increased.

Depending on the number of bytes to be displaced, various short-ecoded instructions may be inserted to generate the displacement. For example, a "nop" instruction, a "test" instruction or a register-to-register move instruction may also be used to generate proper alignment of instructions which would otherwise induce a vector decode.

The "lea ebx, [edi*2+edi]" instruction serves to load the register ebx with the value 3*edi (since address offset multiplier factors are limited to 2, 4, or 8). In instruction (3) from the above code fragment, the lower doubleword of the mm2 register is loaded with the operand at address [edx+edi*2] which corresponds to the imaginary sample Im(n/2). As described above, the "test ax, 04h" instruction is used for the sake of instruction alignment.

Figure 8:
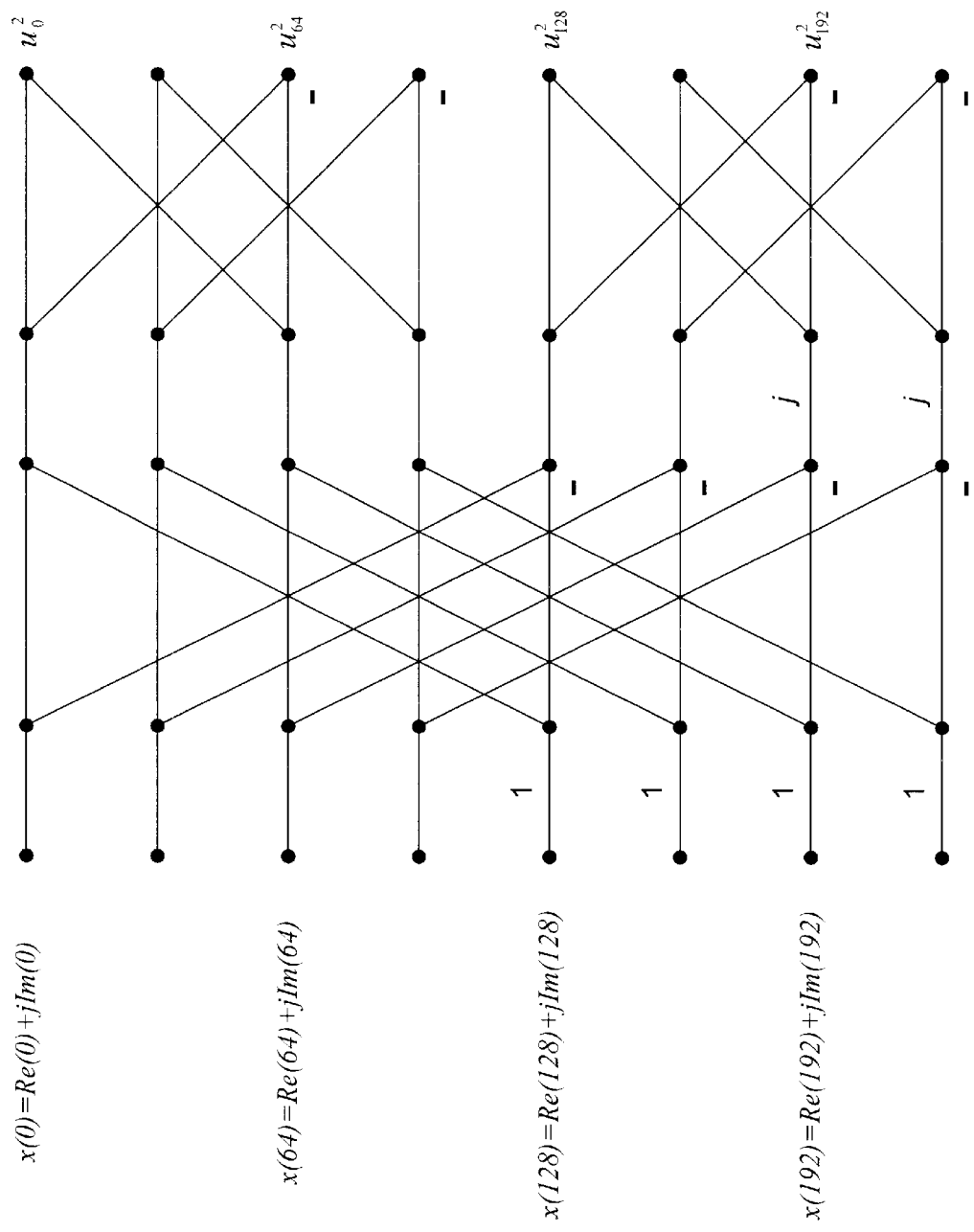
FIG. 8 is a signal flow graph which illustrates the computational structure of the first two passes of the FFT algorithm.

FIG. 8: Butterfly-Pair Iteration Loop 415

FIG. 8 is a signal flow graph which assists in the explanation of the butterfly-pair iteration loop 415. The signal flow graph is shown as receiving the complex samples x(k)=Re(k)+jIm(k) stored in data array 700 as inputs, and producing outputs $u^2(k)$, where the superscript two indicates that the outputs correspond to the second pass of the FFT algorithm. The signal flow graph assumes that N equals 512, i.e. that the number of complex samples is 256. However, the present invention contemplates embodiments where N may be any power of two.

It is observed that the output values $u^2(0)$, $u^2(64)$, $u^2(128)$, and $u^2(192)$ are computed in terms of the complex samples x(0), x(64), x(128), and x(192). More generally, the output values $u^2(k)$, $u^2(k+n/4)$, $u^2(k+n/2)$, and $u^2(k+3n/4)$ are computed in terms of the complex samples x(k), x(k+n/4), x(k+n/2), and x(k+3n/4) for each value of index k running from zero to (n/4)−1, where n is the number of complex samples. The output values are expressible in terms of the inputs as follows:

$$u_k^2 = [(Re_k + Re_{k+n/2}) + (Re_{k+n/4} + Re_{k+3n/4})] + j[(Im_k + Im_{k+n/2}) + (Im_{k+n/4} + Im_{k+3n/4})] \quad (A)$$

$$u_{k+n/4}^2 = [(Re_k + Re_{k+n/2}) - (Re_{k+n/4} + Re_{k+3n/4})] + j[(Im_k + Im_{k+n/2}) - (Im_{k+n/4} + Im_{k+3n/4})] \quad (B)$$

$$u_{k+n/2}^2 = [(Re_k - Re_{k+n/2}) - (Im_{k+n/4} - Im_{k+3n/4})] + j[(Im_k - Im_{k+n/2}) + (Re_{k+n/4} - Re_{k+3/4})] \quad (C)$$

$$u_{k+3n/4}^2 = [(Re_k - Re_{k+n/2}) + (Im_{k+n/4} - Im_{k+3n/4})] + j[(Im_k - Im_{k+n/2}) - (Re_{k+n/4} - Re_{k+3n/4})] \quad (D)$$

Each iteration of the butterfly-pair iteration loop 415 computes complex outputs $u^2(k)$, $u^2(k+n/4)$, $u^2(k+n/2)$ and $u^2(k+3n/4)$ corresponding to equations (A) through (D). An analysis of the above equations reveals that the quantities $a = Re_k + Re_{k+n/2}$, $b = Im_k + Im_{k+n/2}$, $c = Re_{k+n/4} + Re_{k+3n/4}$, and $d = Im_{k+n/4} + Im_{k+3n/4}$, may be computed once, and used to compute two output values, i.e. output values $u^2(k)$ and $u^2(k+n/4)$. A similar comment applies for output values $u^2(k+n/2)$ and $u^2(k+3n/4)$.

This computational redundancy is exploited in the code embodiment of butterfly-pair iteration loop 415 described below.

There are a variety of different ways that parallelism may be exploited in the computations of equations (A) through (D). For example, the computation of output value $u^2(k)$, i.e. equation (A), may be represented in vector notation as follows:

$$u_k^2 = \Omega_1 + \Omega_2,$$

where $$\Omega_1 = \begin{bmatrix} Re_k \\ Im_k \end{bmatrix} + \begin{bmatrix} Re_{k+n/2} \\ Im_{k+n/2} \end{bmatrix}, \text{ and}$$

$$\Omega_2 = \begin{bmatrix} Re_{k+n/4} \\ Im_{k+n/4} \end{bmatrix} + \begin{bmatrix} Re_{k+3n/4} \\ Im_{k+3n/4} \end{bmatrix}.$$

3DNow!™ additions may be used to implement the above vector additions. It is noted that there is no preferred mapping of the two-dimensional vector components above onto 3DNow!™ register components. Once the vector quantities $\Omega_1$ and $\Omega_2$ have been computed, they may also be used in the computation of equation (B), i.e.

$$u_{k+n/4}{}^2 = \Omega_1 - \Omega_2.$$

It is noted that there are many ways that parallelism may be exploited in the computation of equations (A) through (D). Another example is illustrated by the following vector expressions:

$$u_k{}^2 = \Delta_1 = \Delta_2,$$

$$u_{k+n/4}{}^2 = \Delta_1 - \Delta_2,$$

where $$\Delta_1 = \begin{bmatrix} Re_k \\ Im_{k+n/2} \end{bmatrix} + \begin{bmatrix} Re_{k+n/2} \\ Im_k \end{bmatrix}, \text{ and}$$

$$\Delta_2 = \begin{bmatrix} Re_{k+n/4} \\ Im_{k+3n/4} \end{bmatrix} + \begin{bmatrix} Re_{k+3n/4} \\ Im_{k+n/4} \end{bmatrix}.$$

Thus, the present invention contemplates a variety of code embodiments for step 415, each of which exploit modes of parallelism and redundancy inherent in equations (A) through (D).

In general, the butterfly-pair iteration loop 415 comprises (a) executing load instructions to transfer the real and imaginary components of complex inputs x(k), x(k+n/4), x(k+n/2) and x(k+3n/4) from data array 700 into the MMX®/3DNow!™ register file, (b) performing a set of 3DNow!™ arithmetic instructions (additions and subtractions) on the input operands, and (c) executing store instructions to transfer the real and imaginary components of output values $u^2(k)$, $u^2(k+n/4)$, $u^2(k+n/2)$ and $u^2(k+3n/4)$ from the MMX®/3DNow!™ register file to the data array 700.

One embodiment of step 415 is illustrated by the following code fragment.

| | | |
|---|---|---|
| radix4_loop: | | (4) |
| punpckldq | mm0, QWORD PTR[ecx] | (5) |
| punpckldq | mm1, QWORD PTR[ecx + edi] | (6) |
| movq | mm4, mm0 | (7) |
| movd | mm3, DWORD PTR[edx + ebx] | (8) |
| punpckldq | mm2, QWORD PTR[ecx + edi*2] | (9) |
| movq | mm5, mm1 | (10) |
| punpckldq | mm3, QWORD PTR[ecx + ebx] | (11) |
| pfadd | mm4, mm2 | (12) |
| movq | mm6, mm4 | (13) |
| pfadd | mm5, mm3 | (14) |
| pfadd | mm4, mm5 | (15) |
| pfsub | mm6, mm5 | (16) |
| movd | DWORD PTR [edx], mm4 | (17) |
| pfsub | mm1, mm3 | (18) |
| movd | DWORD PTR [edx + edi], mm6 | (19) |
| pfsub | mm0, mm2 | (20) |
| mov | eax, eax | (21) |
| punpckhdq | mm4, mm4 | (22) |
| movd | mm2, DWORD PTR [edx + edi*2 + 4] | (23) |
| punpckhdq | mm6, mm6 | (24) |
| movd | DWORD PTR [ecx], mm4 | (25) |
| punpckldq | mm7, mm1 | (26) |
| movd | DWORD PTR [ecx + edi], mm6 | (27) |
| punpckhdq | mm1, mm7 | (28) |
| movq | mm6, mm0 | (29) |
| pfadd | mm0, mm1 | (30) |
| nop | | (31) |
| add | ecx, 4 | (32) |
| pfsub | mm6, mm1 | (33) |
| movd | mm1, DWORD PTR [edx + edi*4] | (34) |
| movd | DWORD PTR [edx + edi*2], mm0 | (35) |
| movd | DWORD PTR [edx +ebx], mm6 | (36) |
| punpckhdq | mm0, mm0 | (37) |
| add | edx, 4 | (38) |
| movd | DWORD PTR [ecx + ebx - 4], mm0 | (39) |
| nop | | (40) |
| punpckhdq | mm6, mm6 | (41) |
| sub | eax, 4 | (42) |
| movd | mm0, DWORD PTR [edx] | (43) |
| movd | DWORD PTR [ecx + edj*2 - 4], mm6 | (44) |
| jg | radix4_loop | (45) |

Instruction (5) concatenates the real sample Re(k) with the imaginary sample Im(k) already in register mm0, and instruction (6) concatenates the real sample Re(k+n/4) with the imaginary sample Im(k+n/4) into register mm1. Thus, after the execution of instructions (5) and (6), register mm0 equals [Re(k):Im(k)], and register mm1 equals [Re(k+n/4):Im(k+n/4)]. Instruction (7) copies the contents of register mm0 to register mm4.

Instruction (8) loads the imaginary sample Im(k+3n/4) into register mm3, and instruction (9) concatenates the real sample Re(k+n/2) with the imaginary sample Im(k+n/2) already in register mm2. Thus, after the execution of instruction (9), register mm2 contains the pair [Re(k+n/2):Im(k+n/2)].

Instruction (10) copies the contents of register mm1 to register mm5. Instruction (11) loads the real sample Re(k+3n/4) into register mm3. Thus, after instruction (11), register mm3 contains the data pair [Re(k+3n/4):Im(k+3n/4)].

The pfadd instruction (12) induces a parallel add of the contents of register mm4 and mm2 with the results written into register mm4. In shorthand notation, instruction (12) may be represented by the expression mm4=mm4+mm2, where the MMX®/3DNow!™ registers are interpreted as vectors having two floating-point components. After instruction (12), register mm4 will contain the pair [Re(k)+Re(k+n/2):Im(k)+Im(k+n/2)]. Instruction (13) copies register mm4 to register mm6. Instruction (14) implements a parallel add corresponding to the expression mm5=mm5+mm3. After instruction (14), register mm5 contains the pair [Re(k+n/4)+Re(k+3n/4):Im(k+n/4)+Im(k+3n/4)].

Instruction (15) implements the final addition which generates the first complex value output $u^2(k)$. Namely, instruction (15) induces a parallel addition corresponding to the expression mm4=m4+mm5. Instruction (16) implements the final subtraction which generates the second complex value output $u^2(k+n/4)$. Namely, instruction (16) corresponds to the expression mm6=mm6−mm5.

Instruction (17) transfers the imaginary component of $u^2(k)$ to the memory location which heretofore stored imaginary sample Im(k). The pfsub instruction (18) induces a parallel subtraction of registers mm1 and mm3. This subtraction is consistent with the expression mm1=mm1−mm3.

Thus, after instruction (18), the contents of register mm1 is given by [Re(k+n/4)−Re(k+3n/4):Im(k+n/4)−Im(k+3n/4)].

In instruction (19) the imaginary component of $u^2(k+n/4)$ is written to the memory location which heretofore stored imaginary sample Im(k+n/4). Thus, the present embodiment of step 415 comprises an in-place computation. However, the present invention contemplates alternate embodiments of step 415 which are not in-place, i.e. which use separate memory regions to store the input array and the second-pass output array.

Instruction (20) implements the parallel subtraction mm0=mm0−mm2. Thus, after instruction (20), register mm0 contains the data [Re(k)−Re(k+n/2):Im(k)−Im(k+n/2)]. Instruction (21) is inserted to properly align the subsequent instruction (22), i.e. to displace the starting byte of the subsequent instruction (22) away from an end region of a cache line to the beginning of the succeeding cache line.

Instruction (22) induces a duplication of the high-order doubleword of mm4 into both doubleword components of register mm4. Thus, after the execution of instruction (22), register mm4 takes the value

[Re(k)+Re(k+n/4)+Re(k+n/2)+Re(k+3n/4):Re(k)+Re(k+n/4)+Re(k+n/2)+Re(k+3n/4)].

The move doubleword instruction (23) loads the next imaginary sample Im(k+3n/4+1) into register mm2 in order to set up for the next iteration of the loop denoted by label (4), i.e. radix4__4loop. Instruction (24) copies the contents of the high order doubleword of mm6, which equals the real component of complex output $u^2(k+n/4)$, to the low-order doubleword of mm6. Thus, after instruction (24), register mm6 contains the data pair given by

[Re(k)+Re(k+n/2)−Re(k+n/4)−Re(k+3n/4):Re(k)+Re(k+n/2)−Re(k+n/4)−Re(k+3n/4)].

The movd (move doubleword) instruction (25) transfers the low-order double-word of register mm4, i.e. the real component of complex output $u^2(k)$, to the memory location which heretofore stored the real sample Re(k). The movd instruction (27) induces a transfer of the low order doubleword of register mm6, i.e. the real component of complex output $u^2(k+n/4)$, to the memory location which heretofore stored the real sample Re(k+n/4). Instructions (26) and (28) effectively reverse the low-order and high-order halves of mm1, such that register mm1 takes the value

[Im(k+n/4)−Im(k+3n/4):Re(k+n/4)−Re(k+3n/4)].

Instruction (29) copies register mm0 to mm6.

Instruction (30) induces a parallel add according to the rule mm0=mm0+mm1. The nop instruction (31) is inserted for the sake of instruction alignment as discussed earlier. Instruction (32) increments the ecx register by four bytes, i.e. one doubleword, to point to the next real sample.

Instruction (33) implements a parallel subtraction corresponding to the expression mm6=mm6−mm1. This subtraction comprises the last computation in generating the complex output $u^2(k+3n/4)$. Thus, after execution of instruction (33), register mm6 has contents given by

[Re(k)−Re(k+n/2)−Im(n+n/4)+Im(k+3n/4):Im(k)−Im(k+n/2)−Re(k+n/4)+Re(k+3n/4)].

Instruction (34) loads the next imaginary sample Im(k+1) into register mm1 to set up for the next iteration of the radix4__loop.

Instruction (35) writes the lower doubleword of register mm0, i.e. the imaginary component of complex output $u^2(k+n/2)$, to the memory location heretofore occupied by imaginary sample Im(k+n/2). Instruction (36) writes the lower doubleword of register mm6 which comprises the imaginary component of complex output $u^2(k+3n/4)$ to the memory location heretofore occupied by imaginary sample Im(k+3n/4). Instruction (37) copies the high-order doubleword of register mm0, which comprises the real component of complex output $u^2(k+3n/4)$, to the low-order doubleword of mm0.

Instruction (38) increments the edx register by four bytes so that it points to the next imaginary sample Im(k+1) in anticipation of the next iteration of the radix4__loop (4). Instruction (39) transfers the lower doubleword of register mm0, which comprises the real component of complex output $u^2(k+3n/4)$, to the memory location which heretofore stored the real value Re(k+3n/4). The nop instruction (40) is inserted in the code sequence for alignment of subsequent instruction (41). Instruction (41) serves to copy the high doubleword of register mm6 to the low doubleword of mm6. Thus, after instruction (41), register (41) contains the data pair

[Re(k)−Re(k+n/2)−Im(k+n/4)+Im(k+3n/4):Re(k)−Re(k+n/2)−Im(k+n/4)+Im(k+3n/4)].

Instruction (42) subtracts four from the eax register. Since the eax register serves as an iteration counter for the radix4__loop, the condition of eax equal to zero signals the completion of the processing associated with step 415. Instruction (43) sets up register mm0 for the next iteration by loading the next imaginary sample Im(k+1) into the lower doubleword of register mm0. Instruction (44) transfers the real component of complex output $u^2(k+n/2)$ to the memory location heretofore used to store real value Re(k+n/2), effecting an "in-place" computation.

Instruction (45) is a conditional jump instruction which induces a jump to the address identified by the label radix4__loop (4) (i.e. loops back) if the result of the index subtraction operation (42) is greater than zero. If the result of the subtraction operation (42) is equal to zero, control passes to step 417 of FIG. 5.

In the code embodiment of butterfly-pair iteration loop 415, data operands required for computation of the real parts of the complex outputs $u^2(k)$, $u^2(k+n/4)$, $u^2(k+n/2)$ and $u^2(k+3n/4)$ are stored in the upper components of MMX®/3DNow!™ registers, and data operands required for computation of the imaginary parts of the complex outputs are stored in the lower components of the MMX®/3DNow!™ registers. However, this represents an essentially arbitrary choice intended to minimize intermediate data movement. In a second embodiment of butterfly-pair iteration loop 415, the upper components of the MMX®/3DNow!™ registers store operands for the imaginary outputs, and the lower components store operands for the real outputs. In a third embodiment, the imaginary parts of data operands are located within the upper components of the MMX®/3DNow!™ registers, and the real parts of data operands are located within the lower components. Furthermore, alternate embodiments are contemplated where the real parts and imaginary parts of data operands are allocated to upper and lower register components according to any possible allocation scheme.

Figure 9:
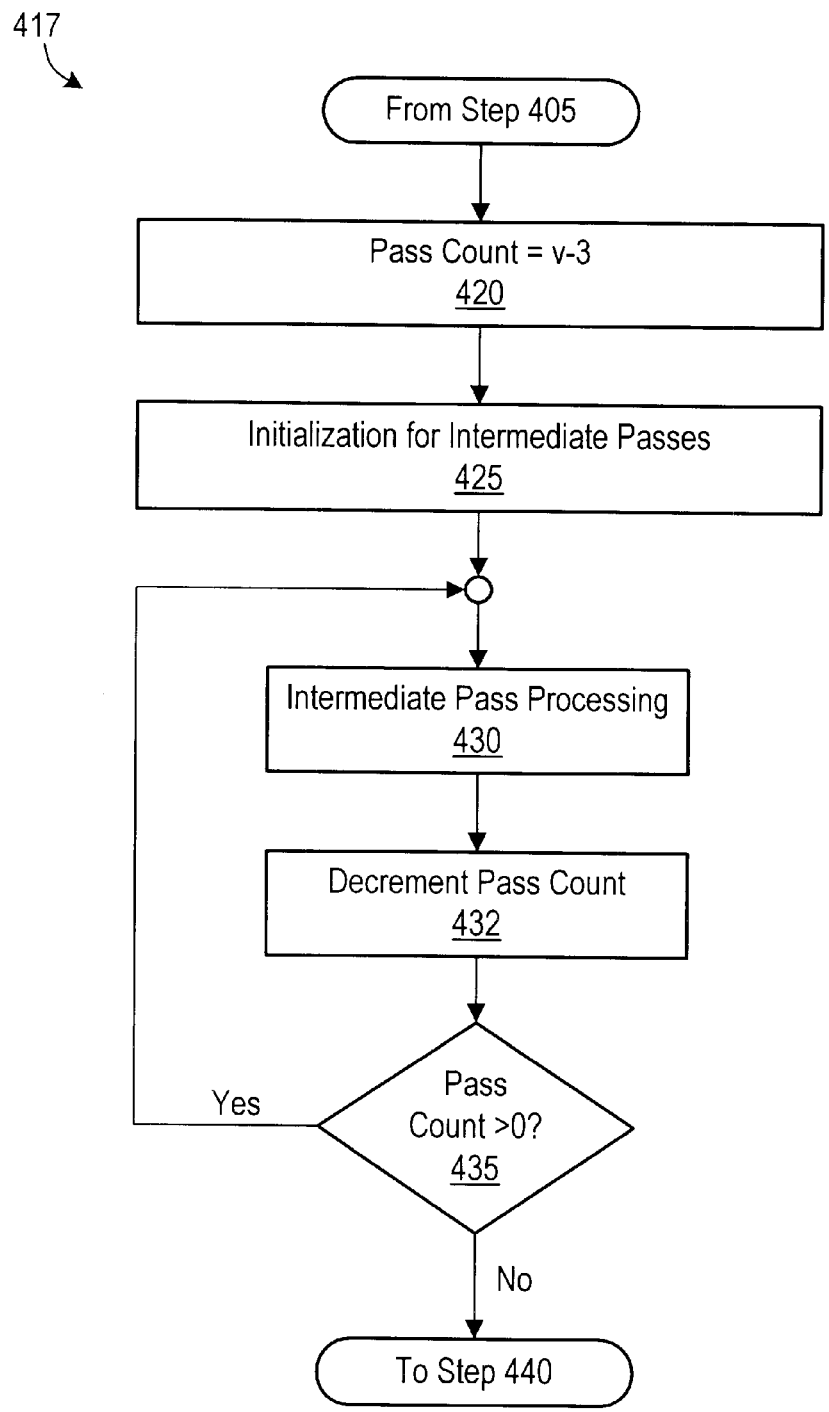
FIG. 9 is a flowchart for step 417, i.e. for processing the intermediate passes of the FFT algorithm according to the present invention.

FIG. 9: Processing of Intermediate Passes

FIG. 9 is a flowchart for step 417, i.e. for processing the intermediate passes of the FFT algorithm. In step 420, a local variable which will be referred to herein as pass count is initialized with a value which is three less than the number of passes v in the FFT algorithm. Since, the first two passes and the last pass of the FFT algorithm are handled by steps 405 and 440 respectively, the value v-3 represents the number of intermediate passes, and therefore the number of iterations through the loop comprising steps 430, 432, and 435.

In step 425, several local variables and registers are initialized for the intermediate pass processing which follows. It is noted that the assignment step 420 may occur before or after step 425, or may occur as a part of step 425 in various embodiments.

In step 430, a single intermediate pass of the FFT algorithm is performed. An intermediate pass corresponds to a pass number m from three to v-1. The processing methodology used in step 430 will be described in detail below. In step 432, the pass count is decremented to indicate that the computations for a pass have been completed. In step 435, a conditional branch (jg jumpaddress) instruction is executed. The conditional branch instruction detects if there are any remaining intermediate passes to be computed. If there are remaining intermediate passes, control passes to step 420. Otherwise control passes to step 440. Thus, step 435 controls the iterative execution of step 430 for each intermediate pass of the FFT algorithm. The processing methodology of step 440 will be described in more detail below.

Figure 10:
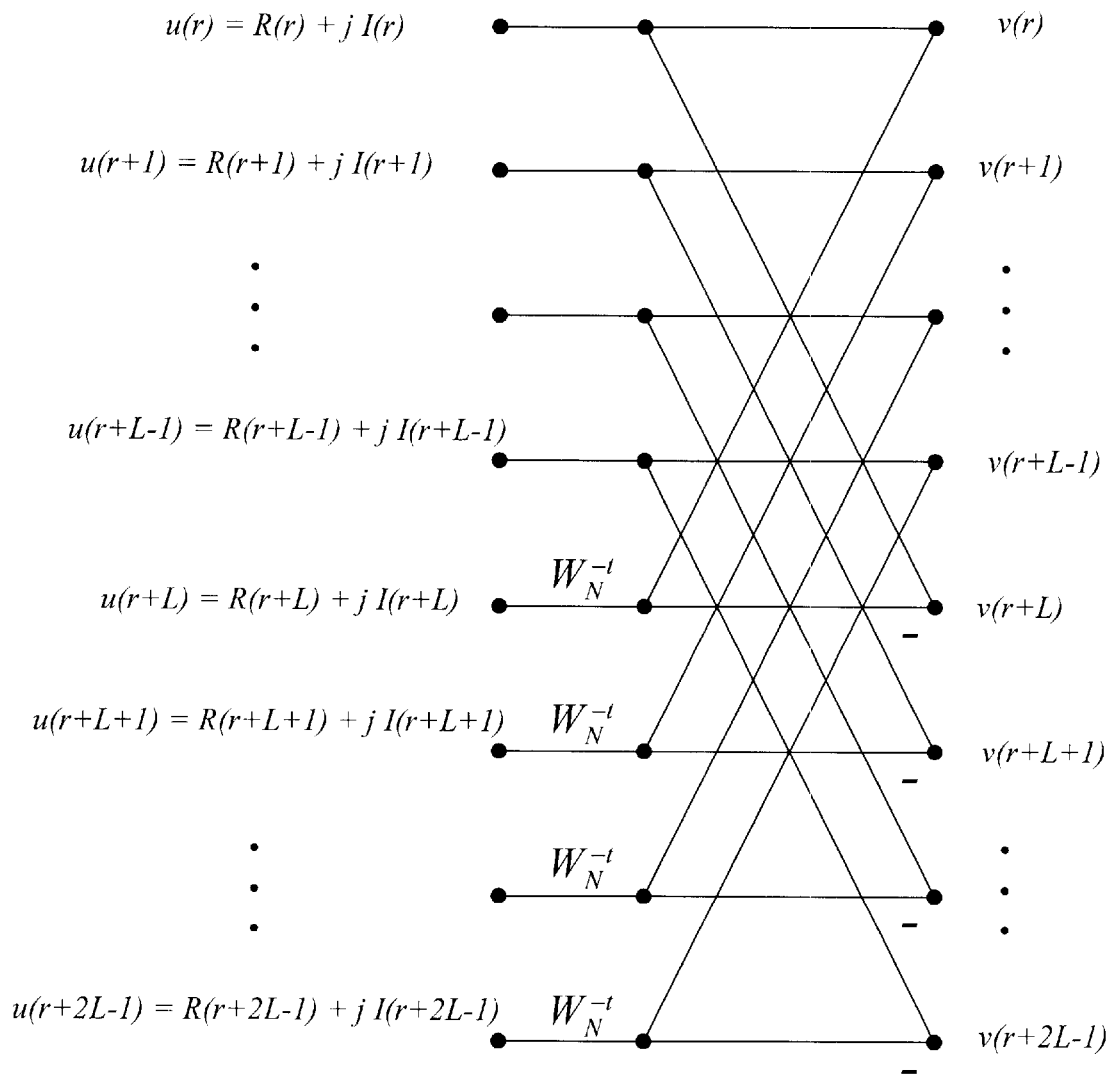
FIG. 10 is a signal flow graph which illustrates the computational structure of a group in an intermediate pass of the FFT algorithm.

To assist in the explanation of steps 425, 430, 432 and 435, a signal flow graph of an arbitrary group in an arbitrary intermediate pass is shown in FIG. 10. Let 2L denote the number of input nodes (i.e. the leftmost nodes) in the group shown in FIG. 10. Each input node receives a corresponding complex input value $u(s)=Re(s)+jIm(s)$. The group also has (2L) output nodes which supply complex output values v(s). The first complex input u(r) to the group has an index r which is a multiple of (2L). The multiple depends upon the group index of the current group within the current pass.

It is observed that the first L complex inputs, i.e. u(r) through u(r+L-1) contribute directly to the output quantities v without a coefficient multiplication. In contrast, the last L complex inputs, i.e. u(r+L) through u(r+2L-1), experience a multiplication by the complex twiddle factor $W_N^{-t}$ before being supplied to an addition or subtraction node. Recall that the complex twiddle factor $W_N^{-t}$ is defined by the relation $$W_N^{-t} = \exp\left(\frac{j2\pi t}{N}\right) = \cos\left(\frac{2\pi t}{N}\right) + j\sin\left(\frac{2\pi t}{N}\right).$$

For notational simplicity, the complex coefficient $W_N^{-t}$ can also be denoted W(-t,N). The exponent t of the complex coefficient W(-t,N) is related to the group number by a mapping which includes bit reversal. Namely, the exponent t is related to the group number by the relation:

$$t = \text{bitreverse}[2^{v-m}k],$$

where v is the total number of passes in the FFT algorithm, i.e. $V=\log_2(N)$, m is the current pass number, where k is interpreted as a v-bit word which ranges from 0 to $2^{m-1}-1$. For example, for v=3, m=2, k=3, the exponent t is given by $$\text{bitreverse}[2*(011)] = \text{bitreverse}[100] = 001,$$

i.e. t=1.

Each butterfly in the group receives a pair of complex samples u(s) and u(s+L) separated by sample distance L. The structure of the signal flow graph leads to the following equations for a butterfly computation:

$$v(s)=[Re(s)+Re(s+L)\cos(\theta)-Im(s+L)\sin(\theta)]+j[Im(s)+Im(s+L)\cos(\theta)+Re(s+L)\sin(\theta)] \quad (E)$$

$$v(s+L)=[Re(s)-Re(s+L)\cos(\theta)+Im(s+L)\sin(\theta)]+j[Im(s)-Im(s+L)\cos(\theta)-Re(s+L)\sin(\theta)] \quad (F)$$

where θ denotes the radian angle $$\frac{2\pi t}{N}.$$

In step 425, a number of initializations are performed for the intermediate passes of the FFT algorithm as illustrated by the following code fragment.

mov esi, __fftn[esp+32] (46)
    mov eax, __fftn1g2m3[esp+32] (47)
    mov DWORD PTR __gp[esp+32], 4 (48)
    shr esi, 3 (49)
    mov __temp_k[esp+32], eax (50)

In instruction (46), the number n of complex samples in data array 700 is loaded into the esi register. In instruction (47), the number of intermediate passes, i.e. v-3, is loaded into the eax register. In instruction (48), the number of groups in the first intermediate pass (i.e. pass m=3) is loaded into the local variable gp. Thus, variable gp takes the value four. In instruction (49), the content of the esi register is shifted right three bits which corresponds to a division by eight. After instruction (49), the esi register contains a value which is equal to one-half of the number of samples in the arbitrary group of the first intermediate pass (m=3), and thus corresponds to the number of butterflies in the current group. In instruction (50), the local variable temp_k is loaded with the content of eax register, i.e. the number of intermediate passes (v-3). The local variable temp_k serves as the pass count. In this embodiment, instruction (50) realizes step 420.

Figure 11:
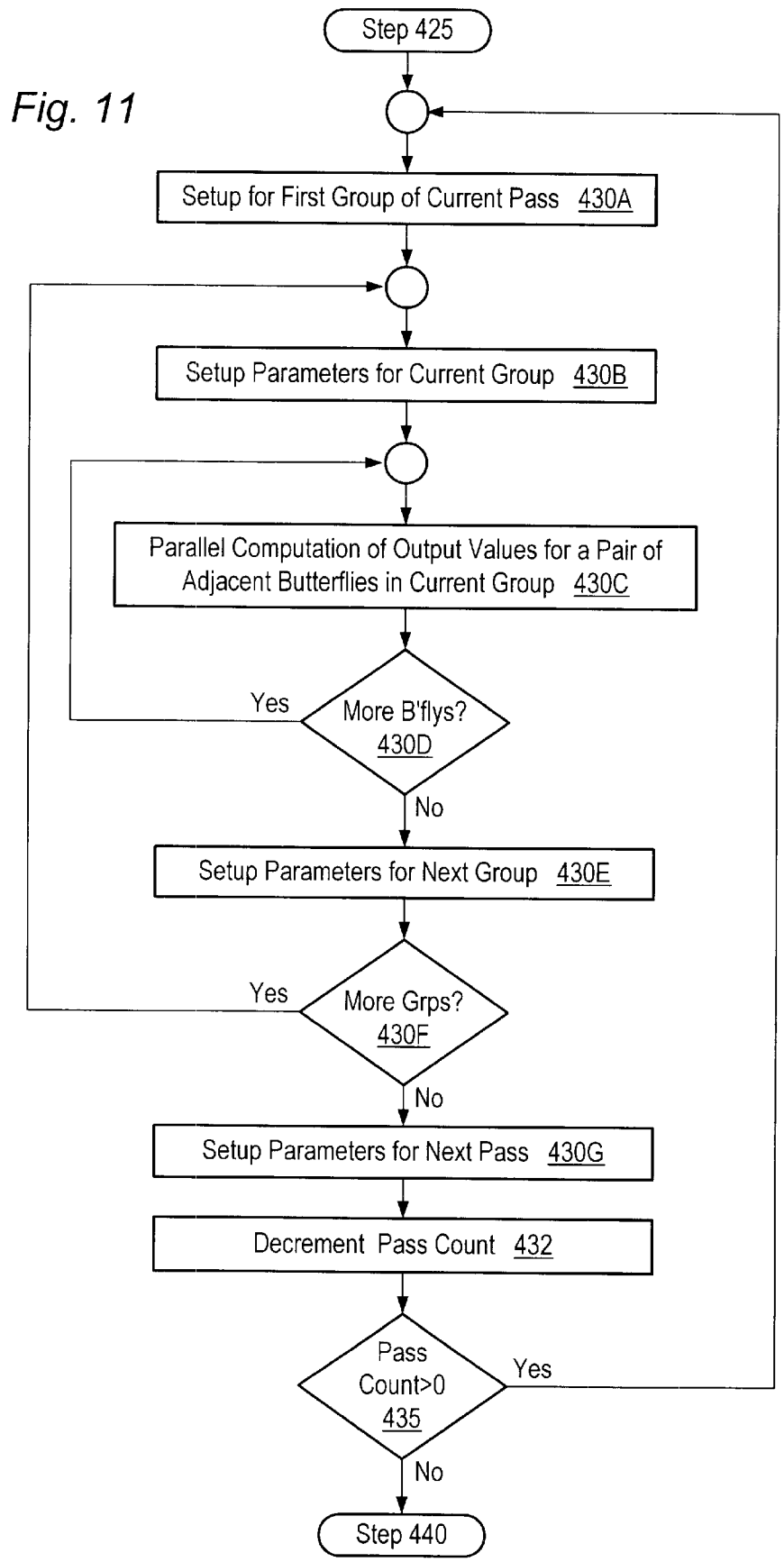
FIG. 11 is a flowchart which elaborates step 430 of FIG. 9 into several component steps according to the present invention.

As described above, steps 430, 432 and 435 implement an iterative loop for processing the intermediate passes of the FFT algorithm. In FIG. 11, step 430 is elaborated as steps 430A through 430G. In step 430A, a number of parameters are initialized for the first group of the current pass as illustrated by the following code fragment.

| | | | |
|---|---|---|---|
| mov | ebx, | __fftrptr[esp + 32] | (51) |
| mov | edi, | __fftiptr[esp + 32] | (52) |
| lea | ecx, | [ebx + esi*4] | (53) |
| lea | edx, | [edi + esi*4] | (54) |
| mov | eax, | 0 | (55) |

Since each butterfly receives two complex inputs u(s) and u(s+L), and each complex input has a real and imaginary component, it is advantageous to employ four pointers: one for each of the components of each butterfly input. Register ebx serves as a pointer to the real component Re(s) of complex input u(s). Register edi serves as a pointer to the imaginary component Im(s) of complex input u(s). Register ecx serves as a pointer to the real component Re(s+L) of complex input u(s+L). Register edx serves as a pointer to the imaginary component Im(s+L) of complex input u(s+L). The first group of any pass accesses complex inputs u(0) and u(L). Thus, in instruction (51), register ebx is initialized with the value of the pointer variable fftrptr which points to real value Re(0). In instruction (52), register edi is initialized with the value of the pointer variable fftiptr which points to imaginary value Im(0). In instruction (53), register ecx is initialized with the effective address of the real component Re(L), i.e. (ebx+4esi). In instruction (54), register edx is initialized with the effective address of the imaginary component Im(L), i.e. (ebx+4esi). In instruction (55), the eax register is initialized with the value zero to indicate that the current group is the first group being processed in the current pass.

In step 430B, a number of parameters for the current group are initialized as illustrated by the following code fragment.

| | | |
|---|---|---|
| movd | mm0, DWORD PTR__brxcos[eax*4] | (56) |
| movd | mm1, DWORD PTR__brxsin[eax*4] | (57) |
| mov | _temp_j[esp + 32], eax | (58) |
| punpckldq | mm0, mm0 | (59) |
| mov | eax, 0 | (60) |
| punpckldq | mm1, mm1 | (61) |
| movq | mm2, QWORD PTR [ecx + eax*4] | (62) |

Since each group employs a different complex coefficient $W_N^{-t}=\cos(\theta)+j\sin(\theta)$, yet all butterflies within that group use the same $W_N^{-t}$, the real component $\cos(\theta)$ and the imaginary component $\sin(\theta)$ of W(−t,N) are advantageously loaded into registers before execution of the butterflies within a group. Instruction (56) loads the real part of W(−t,N) into the lower doubleword of register mm0. Similarly, instruction (57) loads the imaginary part of W(−t, N) into the lower doubleword of register mm1. Pointer _brxcos points to an array which stores the real components of the complex coefficients W(−t,N) in bit-reversed order. Similarly, pointer brxsin points to an array which stores the imaginary components of the complex coefficients W(−t,N) in bit-reversed order. The local variable temp_j is used to store the group number within the current pass. Thus, in instruction (58), temp_j is loaded with the current value of the eax register, which is updated elsewhere.

In instruction (59), the cosine value cos(θ) which currently resides in the lower doubleword of register mm0 is copied to the upper doubleword of register mm0. After instruction (59), register mm0 contains the data pair represented by [cos(θ), cos(θ)], where cos(θ) denotes the real coefficient of W(−t,N) for the current group. In instruction (60), register eax is loaded with the value zero. [Hereafter, the eax register is used to count the butterflies executed within a group.] Instruction (61) copies the sine value sin(θ) currently residing in the lower doubleword of register mm1 to the upper doubleword of mm1. After instruction (61), register mm1 is represented by [sin(θ), sin(θ)], where sin(θ) denotes the imaginary part of complex coefficient W(−t,N) for the current group. In instruction (62), a quadword move (movq) is performed to load two real samples into the register mm2. After instruction (62) has executed register mm2 will contain the data represented by [Re(r+L+1):Re (r+L)], where L denotes one-half the sample length of the current group.

In step 430C, the computations for two successive butterflies from the current group are performed in parallel as illustrated by the following code fragment. Instruction (89) implements step 430D. Note that since groups (of the intermediate passes) always contain an even number of butterflies, the two successive butterflies are always from the same group.

| | | |
|---|---|---|
| movq | mm3, QWORD PTR [edx + eax*4] | (64) |
| movq | mm4, mm2 | (65) |
| pfmul | mm2, mm0 | (66) |
| movq | mm5, mm3 | (67) |

| | | |
|---|---|---|
| pfmul | mm3, mm1 | (68) |
| movq | mm6, QWORD PTR [ebx + eax*4] | (69) |
| pfmul | mm5, mm0 | (70) |
| mov | eax, eax | (71) |
| pfmul | mm4, mm1 | (72) |
| movq | mm7, QWORD PTR [edi + eax*4] | (73) |
| pfsub | mm2, mm3 | (74) |
| movq | mm3, mm6 | (75) |
| pfadd | mm4, mm5 | (76) |
| movd | mm5, mm7 | (77) |
| pfadd | mm3, mm2 | (78) |
| movq | QWORD PTR [ecx + eax*4], mm3 | (79) |
| pfadd | mm5, mm4 | (80) |
| add | eax, 2 | (81) |
| pfsub | mm6, mm2 | (82) |
| movq | QWORD PTR [edx + eax*4 − 8], mm5 | (83) |
| pfsub | mm7, mm4 | (84) |
| movq | mm2, QWORD PTR [ecx + eax*4] | (85) |
| movq | QWORD PTR [ebx + eax*4 − 8], mm6 | (86) |
| cmp | eax, esi | (87) |
| movq | QWORD PTR [edi + eax*4 − 8], mm7 | (88) |
| jl | Step 430C | (89) |

The instructions of the above code fragment implement butterfly equations (E) and (F) for an adjacent pair of butterflies in an optimized parallel fashion. Corresponding operands for the two adjacent butterflies are situated adjacently in memory. In the preferred embodiment, the real components and the imaginary components stored in the real array and imaginary array are doublewords (i.e. 32 bit quantities).

Microprocessor 110 is designed to efficiently access quadword (i.e. 64 bit) memory operands. The memory access time for a quadword operand is no larger than the access time for smaller operands. Thus, microprocessor 110 accesses a quadword operand to/from memory with a single quadword move instruction much faster than it can access two doubleword operands with two doubleword move instructions. Since microprocessor 110 is configured to efficiently access 64 bit memory operands, the corresponding doubleword operands for the two adjacent butterflies may advantageously be accessed with a single quadword move instruction (movq).

Instruction (64) transfers a pair of imaginary samples [Im(s+L+1):Im(s+L)] from the imaginary array to register mm3 using a single movq instruction. Instruction (65) copies the contents of register mm2 to register mm4 in anticipation of multiple uses for the real data in register mm2. Instruction (66) performs a parallel multiplication of register mm2 and mm0 according to the relation mm2= mm2*mm0. Corresponding operands in each register are multiplied together. Instruction (67) copies the contents of register mm3 to register mm5.

In instruction (68), another parallel multiplication is performed which may be summarized by the expression mm3= mm3*mm1. It is noted that a move instruction (67) is interposed between the two parallel multiplication instructions (66) and (68). This interposition advantageously allows the two parallel multiplication instructions (66) and (68) to be more efficiently executed in microprocessor 110 than if they are immediately adjacent in code sequence. Since the two pfmul instructions (66) and (68) require the same execution resource, i.e. the 3DNow!™/MMX® Multiplier 310C, they cannot be executed simultaneously. Thus, by interposing the move instruction (67) between the two pfmul instructions in the above code sequence, the first pfmul instruction (66) and move instruction may be executed simultaneously since they invoke distinct execution resources. Furthermore, the second pfmul instruction

(68) is not forced to wait on the first pfmul instruction (66), since the first pfmul (66) will have completed by the time the second pfmul is ready to be issued.

Instruction (69) transfers a pair of adjacent real samples [Re(s+1):Re(s)] from the real array to register mm6. Instruction (70) performs a parallel multiplication given by the expression mm5=mm5*mm0. Instruction (71) achieves an alignment of instruction (72) as explained above. Instruction (72) performs a parallel multiplication given by the expression mm4=mm4*mm1. Again observe that parallel multiplications (66), (68), (70), and (72) are prevented from inducing a stall conditions by the interposition of other instructions which allow one parallel multiply to finish execution before the next is issued.

Instruction (73) transfers a pair of imaginary sample [Im(s+1):Im(s)] from the imaginary array to register mm7. Instruction (74) performs a parallel subtraction according to the relation mm2=mm2−mm3, i.e. corresponding components of each register are subtracted. Instruction (75) copies the contents of register mm6 to register mm3. Instruction (76) performs a parallel add of the contents of register mm4 and mm5 according to the prescription mm4=mm4+mm5.

It is noted that by performing the computations for two adjacent butterflies simultaneously, the code embodiment of step 430C described above advantageously uses all of the mm registers mm0 through mm7. If three or more butterflies were computed in the code embodiment of 430C, the per-butterfly computational efficiency would typically decrease due in part to the need to reuse the MMX®/3DNow!™ registers.

Instruction (77) copies the contents of register mm7 to register mm5. In instruction (78), a parallel add is performed according to the rule mm3=mm3+mm2. In instruction (79), the real components of butterfly outputs v(s+L) and v(s+L+1) are written to the real array in memory in a single quadword move (movq). Again, it is noted that moving a pair of resultant values to memory for the corresponding pair of butterflies in a single movq instruction decreases the store time per resultant value. By repeatedly using quadword moves instead of pairs of doubleword moves, the overall execution time of step 430C is significantly decreased, especially since memory store and fetch times are a significant bottleneck in very fast microprocessors such as are being discussed.

Instruction (80) performs a parallel add according to the rule mm5=mm5+mm4. In instruction (81), the eax register is incremented by two, anticipating the completion of computations on the current pair of butterflies in instruction (88). Instruction (82) performs a parallel subtraction according to the rule mm6=6−mm2. The movq instruction (83) transfers the imaginary components of butterfly outputs v(s+L) and v(s+L+1) to the imaginary array. Instruction (84) performs a parallel subtraction according to the relation mm7=mm7−mm4.

In instruction (85), a pair of real operands are loaded into mm2 in anticipation of the next iteration of step 430C. Instruction (86) transfers the real components of butterfly resultant values v(s) and v(s+1) to the real array in a single quadword move.

Instruction (87) compares the contents of the eax register to the contents of the esi register resulting in the setting of one or more flags in a flags register depending upon the result of the comparison. Instruction (88) transfers the imaginary components of butterfly resultant values v(s) and v(s+1) to the imaginary array in memory.

Instruction (89) which implements step 430D is a conditional jump instruction. If the comparison of instruction (87) detected that eax was less than esi, program control continues with a next iteration of step 430C. If however, the comparison instruction (87) detected equality of eax and esi, then execution continues with step 430E of FIG. 11.

It is noted that 3DNow!™ arithmetic instructions (74), (76), (78), (80), (82), and (84) are interleaved with instructions (75), (77), (79), (81), and (83) which do not exploit the 3DNow!™ ALU 310E. Thus, the 3DNow!™ arithmetic instructions may be executed more efficiently than if they if were arranged adjacently. The interspersed instructions, since they do not compete for use of 3DNow!™ ALU 310E, execute in parallel with the 3DNow!™ instructions. Thus, the execution rate of the code sequence given by instructions (74) through (84) may advantageously achieve the theoretical maximum of two instructions per cycle.

A similar observation may be made with respect to load instructions (64), (69), (73) and (85). These instructions which invoke load unit 236A are separated from one another in the above code fragment to minimize stall conditions in the load pipeline. Other instructions which exploit execution resources other than load unit 236A are placed between the load instructions. These "other instructions" include the parallel floating-point instructions, etc.

As with the load instructions, store instructions (79), (83), (86) and (88) which exploit store unit 236B are separated from one another in the above code frggment. Other instructions which do not invoke store unit 236B are placed between the store instructions to maximize the likelihood that one store instructions clears the store pipeline before another is issued to store unit 236B.

In addition, it is noted that the above code fragment (which implements step 430C) exploits the similarity of the computational structure of the butterflies within a group. Since the same set of computations must be applied for each butterfly in a group, and certain subcalculations may appear as factors in multiple final output calculations, the computations for two adjacent butterflies are advantageously performed in parallel. In the body of the code fragment above, the upper doubleword of an MMX®/3DNow!™ register may hold a value connected with the computation of equation (E) or (F) for a first butterfly, while the lower doubleword of the mm register may hold a corresponding value for the second adjacent butterfly. Thus, using a single set of parallel additions, subtractions, and multiplications, the output values connected with two butterflies may be efficiently computed.

In step 430E, a number of parameters are set up for the next group to be executed as illustrated by the following code fragment.

| mov | eax, esi | (90) |
| shl | eax, 3 | (91) |
| add | ecx, eax | (92) |
| add | edx, eax | (93) |
| add | ebx, eax | (94) |
| add | edi, eax | (95) |
| mov | eax, tempj [esp + 32] | (96) |
| add | eax, 1 | (97) |
| cmp | eax, [esp + 32] | (98) |
| jl | Step 430B | (99) |

In instructions (90) through (95), the real and imaginary data pointer registers ecx, edx, ebx, and edi are reinitialized to point to the data for the first butterfly of the next group. Thus, each pointer register is incremented by a byte displacement corresponding to the distance between groups (2L). In instruction (96), the local variable temp_j which stores the current group number is loaded into register eax. Instruction (97) increments register eax to indicate that the calculations for a group have just been completed. In instruction (98), the eax register content is compared to the variable gp which stores the number of groups in the current pass. The conditional branch instruction (99) causes program flow to resume with the next iteration of step 430B if the eax register was less than variable gp. Otherwise, program flow continues with step 430G. It is noted that instruction (99) implements step 430F of FIG. 11. Note that if program flow is to iterate again, the incremented value of temp_j in eax is stored in instruction (58).

In step 430G, a number of parameters are set up for the next pass of the FFT algorithm as illustrated in the following code fragment.

```
mov    eax, _gp[esp + 32]          (101)
shr    esi, 1                       (102)
shl    eax, 1                       (103)
dec    DWORD PTR temp_k[esp + 32]   (104)
mov    _gp[esp + 32], eax           (105)
jg     Step430A                     (106)
```

Instruction (101) loads the variable gp which indicates the number of groups into the eax register. Since, the number of groups gp doubles with each successive pass, instruction (103) performs a doubling of the eax register contents by shifting those contents one position to the left. In instruction (105), the doubled value of the eax register is written into the local variable gp. In addition, with each successive pass, the number of butterflies within each group is halved. Thus, instruction (102) implements a division by two by shifting the esi register contents one position to the right. Instruction (104) implements step 432 by decrementing the local variable temp_k which counts the remaining number of passes. Also, instruction (106) implements step 435 by performing a conditional jump. If the result of the decrement operation (104) indicates a value greater than zero, then program flow continues with step 430A. Otherwise, program flow continues with step 440.

Step 440: Last Pass Processing

Figure 12:
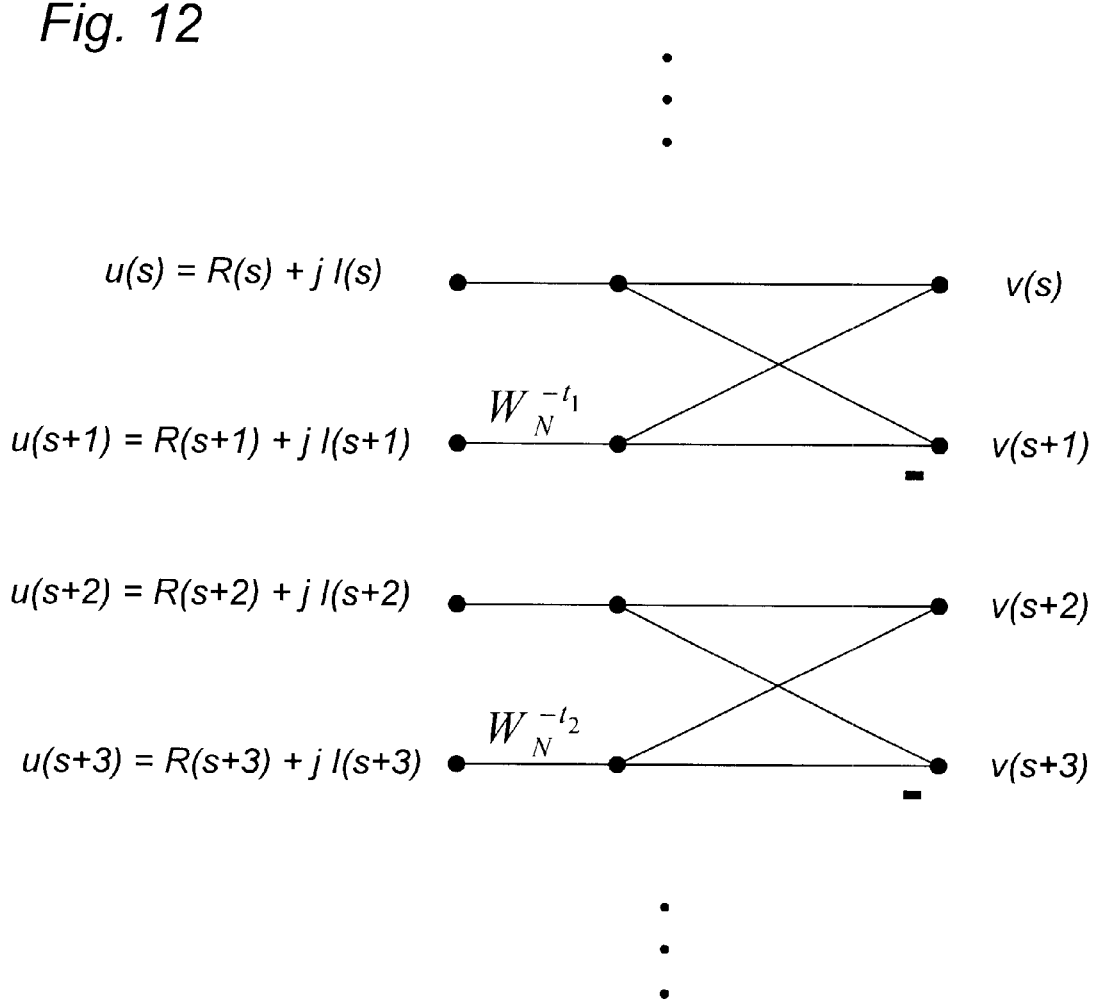
FIG. 12 is signal flow graph abstracted from the last pass of the FFT algorithm.

In step 440, the last pass of the FFT algorithm is performed. FIG. 12 represents a portion of the last pass by means of a signal flow graph. Each butterfly of the last pass constitutes a unique group, i.e. there is only one butterfly per group. Thus, each butterfly has a unique complex coefficient $W(-t_k,N)$. Each butterfly accesses a pair of complex inputs u and generates a corresponding pair of complex outputs v. For example, the first butterfly shown in FIG. 12 receives complex inputs u(s)=Re(s)+jIm(s) and u(s+1)=Re(s+1)+jIm(s+1), and generates complex outputs v(s) and v(s+1). In step 440, two adjacent butterflies are computed in parallel, thereby taking advantage of the similarity in structure of the butterflies of the last pass, even with different twiddle factors. Pairs of butterflies are processed in an iterative loop to be described shortly. However, a number of parameters are initialized before the iterative loop commences as illustrated by the following code fragment.

```
mov    ebx, _fftn[esp + 32)         (107)
mov    ecx, _fftrptr[esp + 32]      (108)
mov    edx, _fftiptr[esp + 32]      (109)
mov    eax, 0                       (110)
lea    edj, DWORD PTR _brxcos       (111)
lea    esi, DWORD PTR _brxsin       (112)
```

Instruction (107) loads the local variable fftn (which represents the number of complex samples) into register ebx. Instructions (108) and (109) initialize the ecx and edx to point to the beginning of the real array and imaginary array respectively. In instruction (110), the eax register which is to serve as a counter of completed butterflies, as a data index, and also as an index into the coefficient tables is initialized to zero. In instruction (111), the edi register is initialized to point to the array of cosine values. In instruction (112), the esi register is initialized to point to the array of sine values in memory. Corresponding entries of the cosine array and sine array contain cosine and sine values respectively which form the real and imaginary components of complex coefficients $W(-t_k,N)$.

In one embodiment, the iterative loop of step 440 is implemented by the following code fragment.

```
_last_radix2_loop_3dx:                              (113)
movq       mm2, QWORD PTR [ecx + eax*4]             (114)
movq       mm3, QWORD PTR [ecx + eax*4 + 8]         (115)
movq       mm5, QWORD PTR [edx + eax*4 + 8]         (116)
movq       mm4, QWORD PTR [edx + eax*4]             (117)
movq       mm6, mm2                                 (118)
punpckhdq  mm2, mm3                                 (119)
punpckldq  mm3, mm6                                 (120)
movq       mm6, mm4                                 (121)
punpckhdq  mm4, mm5                                 (122)
punpckldq  mm5, mm6                                 (123)
movq       mm0, QWORD PTR [edi + eax*2]             (124)
punpckldq  mm6, mm3                                 (125)
punpckldq  mm7, mm5                                 (126)
movq       mm1, QWORD PTR [esi + eax*2]             (127)
punpckhdq  mm3, mm6                                 (128)
movq       mm6, mm2                                 (129)
pfmul      mm2, mm0                                 (130)
punpckhdq  mm5, mm7                                 (131)
pfmul      mm6, mm1                                 (132)
movq       mm7, mm4                                 (133)
pfmul      mm4, mm1                                 (134)
pfmul      mm7, mm0                                 (135)
pfadd      mm6, mm7                                 (136)
pfsub      mm2, mm4                                 (137)
movq       mm7, mm5                                 (138)
pfadd      mm5, mm6                                 (139)
movq       mm4, mm3                                 (140)
pfadd      mm3, mm2                                 (141)
pfsub      mm4, mm2                                 (142)
add        eax, 4                                   (143)
pfsub      mm7, mm6                                 (144)
movq       mm2, mm4                                 (145)
movq       mm6, mm7                                 (146)
punpckldq  mm2, mm3                                 (147)
punpckhdq  mm4, mm3                                 (148)
movq       QWORD PTR [ecx + eax*4 – 16], mm2        (149)
punpckldq  mm6, mm5                                 (150)
movq       QWORDPTR[ecx + eax*4 – 8], mm4           (151)
punpckhdq  mm7, mm5                                 (152)
movq       QWORD PTR [edx + eax*4 – 16], mm6        (153)
cmp        eax, ebx                                 (154)
movq       QWORD PTR [edx + eax*4 – 8], mm7         (155)
jl         _last_radix2_loop_3dx                    (156)
```

Each of instructions (114) through (117) transfer a pair of real or imaginary operands to registers mm2 through mm5 in preparation for the calculation of two adjacent butterflies of the last pass. In instruction (114), a pair of real values [Re(s+1):Re(s)] for a first butterfly are transferred from the real array to register mm2. In instruction (115), the pair of real values [Re(s+3):Re(s+2)] for a second succeeding butterfly is transferred from the real array to register mm3. In instruction (116), the pair of imaginary values [Rm(s+3):Im(s+2)], corresponding to the real pair already accessed for the second butterfly, is transferred from the imaginary array to register mm5. In instruction (117), the pair of imaginary values [Im(s+1):Im(s)], corresponding to the real pair already accessed for the first butterfly, is transferred from the imaginary array to register mm4.

Instruction (118) copies register mm2 to register mm6. Instruction (119) maps the high-order doublewords of registers mm2 and mm3 into register mm2. After the execution of instruction (119), register mm2 will contain the data given by [Re(s+3):Re(s+1)]. Instruction (120) maps the low-order doublewords of register mm3 and mm6 to register mm3. In response to instruction (120), register mm3 will store the values given by [Re(s):Re(s+2)]. Instruction (121) copies register mm4 to register mm6. Instruction (122) maps the high-order doublewords of registers mm4 and mm5 to register mm4, thereby giving mm4 the value [Im(s+3):Im(s+1)]. Instruction (123) maps the low-order doublewords of registers mm5 and mm6 to register mm5, thereby giving register mm5 the content [Im(s):Im(s+2)].

Instruction (124) transfers a pair of cosine values [cos(b):cos(a)] from the cosine array to register mm0. The cosine values cos(a) and cos(b) comprise the real component of the complex coefficients $W(-t_k,N)$ for the first and second butterflies respectively. Note that register eax is multiplied by four to index into data buffer 700 and multiplied by two to index into the coefficient array.

Instruction (125) maps the low-order doublewords of registers mm6 and mm3 to register mm6, thereby giving register mm6 the data content [Re(s+2):Im(s)]. Instruction (126) maps the low-order doublewords of registers mm7 and mm5 to register mm7, thereby giving register mm7 the content [Im(s+2):x], where the "x" denotes a "don't care" value. Instruction (127) transfers a pair of sine values [sin(b):sin(a)] from the sine array to register mm1. The sine values sin(a) and sin(b) comprise the imaginary components of the complex coefficients $W(-t_k,N)$ for the first and second butterflies respectively.

Instruction (128) maps the high-order doublewords of registers mm3 and mm6 to register mm3, thereby giving register mm3 the content [Re(s+2):Re(s)]. Instruction (129) copies the content of register mm2 to register mm6. Instruction (130) performs a parallel multiplication according to the rule mm2=mm2*mm0 to obtain an intermediate result. Instruction (131) maps the high-order doublewords of register mm5 and mm7 to register mm5. Instruction (132) performs a parallel multiplication according to the expression mm6=mm6*mm1. Instruction (133) copies the content of register mm4 to register mm7. Instruction (134) performs a parallel multiplication according to the rule mm4=mm4*mm1. Similarly, instruction (135) performs a parallel multiplication according to prescription mm7=mm7*mm0. Instruction (136) performs a parallel addition in conformity with the expression mm6=mm6+mm7. Instruction (137) performs a parallel subtraction according to the expression mm2=2−mm4. Instruction (138) copies the content of register mm5 to register mm7. Instruction (139) performs aparallel addition in accordance with the rule mm5=mm5+mm6. Instruction (140) copies the content of register mm3 to register mm4.

Instruction (141) performs a parallel addition according to the prescription mm3=mm3+mm2. Instruction (142) performs a parallel subtraction according to the rule mm4=mm4−mm2. Instruction (143) adds four to the eax register in anticipation of the completion of the computations on the current pair of butterflies; each butterfly corresponds to two samples, thus two adjacent butterflies corresponds to four samples. Instruction (144) performs a parallel subtraction according to the rule mm7=mm7−mm6. Instruction (145) copies the content of register mm4 to register mm2. Instruction (146) copies the content of register mm7 to register mm6. Instruction (147) maps the low-order doublewords from registers mm2 and mm3 to register mm2. Instruction (148) maps the high-order doublewords from registers mm4 and mm3 to register mm4. These two instructions have the effect of reordering some of the calculated results to an ordering that facilitates faster writing to memory.

Instruction (149) transfers the real components of complex outputs v(s) and v(s+1) corresponding to the first butterfly to the real array in a single quadword move operation. Instruction (150) maps the low-order doublewords from registers mm6 and mm5 to register mm6. Instruction (151) transfers the real components of complex outputs v(s+2) and v(s+3) corresponding to the second butterfly to the real array in a single quadword move operation. Instruction (152) maps the high-order doublewords of registers mm7 and mm5 to register mm7. Instruction (153) transfers the imaginary components of complex outputs v(s) and v(s+1) corresponding to the first butterfly to the imaginary array.

Instruction (154) compares the content of register eax with the content of register ebx setting one or more flags in a flags register depending on the result of the comparison. Instruction (155) transfers the imaginary components of complex outputs v(s+2) and v(s+3) corresponding to the second butterfly to the imaginary array. Instruction (155) is a conditional jump. If the comparison of instruction (154) detected that the eax register is less than the ebx register, then execution flow continues with the label (113) denoted—_last_radix2_loop_3dx. Otherwise, the FFT algorithm terminates after restoring the condition of the stack. Note that move instructions, 3DNow!™ instructions and MMX® instructions do not affect the state of the conditions flags.

It is noted that the code embodiment of step 440 given above advantageously employs the technique of interleaving 3DNow!™ instructions with other instructions which do not induce resource conflicts. For example, parallel multiply instructions (130), (132), and (134) are interleaved with instructions (131) and (133) which do not require the same resource as the parallel multiplies. Therefore, both the parallel multiply instructions and the interleaved instructions (131) and (133) execute with increased efficiency relative to algorithms which allow resource conflicts and consequent stall conditions. Furthermore, it is noted that the computations for two adjacent butterflies are computed in parallel in each iteration of step 440.

Because of the SIMD (single-instruction multiple-data) usage of the 3DNow!™ technology, because the code fragment above operates on two adjacent butterflies, and because of highly efficient code structure, the efficiency of step 440 is improved relative to prior art algorithms.

Although the discussions above have focussed on a decimation-in-time FFT computation, it is understood that an alternate embodiment using decimation-in-frequency may be easily configured according to the optimization principles and overall method and approach herein described.

Forward Transformation

It is noted that the FFT algorithm discussed above implements an inverse FFT. However, the FFT algorithm may also implement a forward FFT simply by replacing the complex coefficients W(−t,N) with their conjugates W(t,N), and multiplying the output values by an appropriate scalar constant. Alternatively, the scalar multiplication in the forward FFT may be avoided by prescaling the complex coefficient W(t, N). Conjugation of a complex quantity corresponds to negating the imaginary part and preserving the real part of the complex quantity.

Applications

The Fast Fourier Transform procedure of the present invention may be used to perform spectral analysis and/or synthesis on any of a variety of signals such as, e.g., audio signals, acoustic signals, video signals, seismic signals, etc. For example, a computer sound system may receive an audio signal (encoded or not) from an external source through a sound card, via a DVD drive, from broadcast sources, from the Internet, or from other media. A digitized audio stream is transferred from the receiving device (e.g. a sound card) to system memory. The digitized audio data may be partitioned into blocks for FFT analysis and synthesis.

In various embodiments, the computer system may receive signal information from any of an array of peripheral devices coupled to the computer system, and partition the signal data into blocks. A forward or inverse Fourier transform may then be performed on any or all blocks according to the methods described above.

Accordingly, various modifications and changes may be made without departing from the spirit and scope of the invention as set forth in the claims. It should be noted that numerous variations and modifications will become apparent to those skilled in the art once the above disclosure is fully appreciated. It is intended that the following claims be interpreted to embrace all such modifications and changes. The specification and drawings are to be regarded in an illustrative rather than a restrictive sense.

What is claimed is:

1. A method for implementing a fast Fourier transform (FFT) in a computer system including an x86 processor and a memory, wherein the x86 processor includes a plurality of internal registers, wherein the x86 processor is configured to execute a set of parallel floating-point instructions, wherein each of the parallel floating-point operations specifies one or more of the internal registers, the method comprising:

executing a first processing loop, wherein the first processing loop accesses an input array from the memory and generates a second-pass output array, wherein the input array comprises N complex input values;

executing a first number of intermediate-pass processing iterations, wherein a first one of the intermediate-pass processing iterations operates on the second-pass output array, wherein a last one of the intermediate-pass processing iterations generates a penultimate-pass output array;

executing a final-pass processing loop which operates on the penultimate-pass output array and generates a final output array, wherein the final output array represents a transformation result;

wherein a generic intermediate-pass processing iteration of the first number of intermediate-pass processing iterations operates on an intermediate input array and generates an intermediate output array, and comprises a plurality of group iterations, wherein a generic group iteration of the plurality of group iterations comprises a first plurality of butterfly-pair iterations, wherein each of the first plurality of butterfly-pair iterations comprises executing a first code sequence which includes a first plurality of the parallel floating-point instructions, wherein the first code sequence operates on four complex input values from the intermediate input array and generates four complex output values of the intermediate output array, wherein the four complex input values and the four complex output values correspond to two adjacent butterflies in the generic intermediate-pass.

2. The method of claim 1, wherein other instructions are included in the first code sequence in addition to the first plurality of the parallel floating-point operations, wherein the first code sequence is stored in the memory, wherein one of the other instructions is inserted between any two of the first plurality of the parallel floating-point instructions which use a common execution resource in the x86 processor, wherein said one of the other instructions invokes a second execution resource distinct from the common execution resource.

3. The method of claim 2, wherein the first code sequence also includes an alignment instruction, wherein the alignment instruction is inserted in the first code sequence to guarantee that the first byte of a second instruction, immediately succeeding the alignment instruction in the first code sequence, is not stored in a region at the end of a first cache line and is stored into a second cache line subsequent to the first cache line.

4. The method of claim 3, wherein the alignment instruction comprises an instruction which has a null effect on the transformation result.

5. The method of claim 2, wherein the other instructions of the first code sequence include a plurality of load instructions, wherein the load instructions are separated from each other in the first code sequence by non-load instructions, wherein the non-load instructions include some of the first plurality of the parallel floating-point instructions.

6. The method of claim 5, wherein each of the load instructions invokes the transfer of two input operands from the intermediate input array in memory to one of the internal registers, wherein the two input operands include a first operand which is transferred to a first component of said one of the internal registers, wherein the two input operands include a second operand which is transferred to a second component of said one of the internal registers, wherein the first operand represents first input data for a first butterfly of the two adjacent butterflies, wherein the second operand represents second input data for a second butterfly of the two adjacent butterflies.

7. The method of claim 2, wherein the other instructions of the first code sequence include store instructions, wherein the store instructions are separated from each other in the first code sequence by non-store instructions, wherein the non-store instructions include some of the first plurality of parallel floating-point instructions.

8. The method of claim 7, wherein each of the store instructions invokes the transfer of two output operands in one of the internal registers to the intermediate output array in memory, wherein the two output operands include a first output operand which is transferred from a first component of said one of the internal registers to the intermediate output array, wherein the two output operands include a second output operand which is transferred from a second component of said one of the internal registers to the intermediate output array, wherein the first output operand represents a first resultant value for a first butterfly of the two adjacent butterflies, wherein the second output operand represents a second resultant value for a second butterfly of the two adjacent butterflies.

9. The method of claim 1, wherein executing the final-pass processing loop comprises executing a second plurality of butterfly-pair iterations, wherein a generic butterfly-pair iteration of the second plurality of butterfly-pair iterations comprises executing a second code sequence which includes a second plurality of the parallel floating-point instructions, wherein the second code sequence operates on four complex input operands from the penultimate-pass output array and generates four complex resultant values, wherein the four complex input operands and the four complex resultant values correspond to two successive butterflies in the final pass of the FFT.

10. The method of claim 9, wherein the second code sequence further comprises a plurality of load instructions, wherein each of the load instructions induces the transfer of two input operands situated adjacently in the penultimate-pass array to one of the internal registers, wherein the two input operands include a first input operand which is transferred to a first component of said one of the internal registers, wherein the two input operands include a second input operand which is transferred to a second component of said one of the internal registers, wherein the first input operand corresponds to a first butterfly of the two successive butterflies, wherein the second input operand corresponds to a second butterfly of the two successive butterflies.

11. The method of claim 9, wherein the second code sequence further comprises a plurality of store instructions, wherein each of the store instructions induces the transfer of two output operands from one of the internal register to adjacent locations in the final output array, wherein the two output operands includes a first output operand which is transferred from a first component of said one of the internal registers to the final output array, wherein the two output operands includes a second output operand which is transferred from a second component of said one of the internal registers to the final output array, wherein the first output operand corresponds to a first butterfly of the two successive butterflies, wherein the second output operand corresponds to a second butterfly of the two successive butterflies.

12. The method of claim 1, wherein said executing a first processing loop comprises performing a second number of loop iterations, wherein each of the second number of loop iterations comprises executing a third plurality of the parallel floating-point instructions.

* * * * *